(12) United States Patent
Sweere et al.

(10) Patent No.: US 11,958,352 B1
(45) Date of Patent: Apr. 16, 2024

(54) RECONFIGURATION OF COMBUSTION ENGINE POWERED HAUL TRUCK WITH HYBRID HYDROGEN FUEL CELL AND BATTERY POWER SUPPLY

(71) Applicant: First Mode Holdings, Inc., Seattle, WA (US)

(72) Inventors: Joshua M. Sweere, Seattle, WA (US); Spencer M. Anunsen, Seattle, WA (US); Larissa Y. Kunz, Seattle, WA (US); Harlan Thomas Kuo, Seattle, WA (US); Alexis R. HUmann, Seattle, WA (US); David T. Gerhardt, Seattle, WA (US); Krunal Desai, Seattle, WA (US); Peter Illsley, Seattle, WA (US); Clara Sekowski, Seattle, WA (US); Sarah Balles, Seattle, WA (US)

(73) Assignee: First Mode Holdings, Inc., Seattle, WA (US)

( * ) Notice: Subject to any disclaimer, the term of this patent is extended or adjusted under 35 U.S.C. 154(b) by 0 days.

(21) Appl. No.: 18/493,450

(22) Filed: Oct. 24, 2023

Related U.S. Application Data

(60) Provisional application No. 63/586,253, filed on Sep. 28, 2023.

(51) Int. Cl.
*B60K 1/04* (2019.01)
*H01M 8/04029* (2016.01)
(Continued)

(52) U.S. Cl.
CPC .......... *B60K 1/04* (2013.01); *H01M 8/04029* (2013.01); *H01M 8/04208* (2013.01);
(Continued)

(58) Field of Classification Search
CPC ............... B60K 1/04; B60K 2001/005; B60K 2001/0405; H01M 8/04029; H01M 16/008
See application file for complete search history.

(56) References Cited

U.S. PATENT DOCUMENTS

| 2,912,184 A | 11/1959 | Lee |
| 6,053,266 A | 4/2000 | Greenhill |

(Continued)

FOREIGN PATENT DOCUMENTS

| AU | 2020360617 A1 | 7/2021 |
| CN | 105932191 A | 9/2016 |

(Continued)

OTHER PUBLICATIONS

Final Rejection Office Action for U.S. Appl. No. 17/675,303 mailed on Oct. 28, 2022, 15 pages.
(Continued)

*Primary Examiner* — Jason D Shanske
*Assistant Examiner* — James J Triggs
(74) *Attorney, Agent, or Firm* — COOLEY LLP

(57) ABSTRACT

A retrofit mining haul truck includes a hybrid hydrogen fuel cell/battery-based powerplant in place of a carbon fuel-based powerplant. The retrofit mining haul truck includes a frame, a tray coupled to the frame, and a deck coupled to the frame forward of at least a portion of the tray. A battery system is mounted to the deck of the retrofit mining haul truck. A hydrogen storage system (HSS) is installed in an engine bay volume of the retrofit mining haul truck. The engine bay was configured to contain a combustion engine (e.g., a diesel engine) prior to retrofitting the retrofit mining haul truck. At least a portion of a fuel cell system is installed in a wheel pocket of the retrofit mining haul truck. The (Continued)

wheel pocket was configured to contain a diesel tank prior to retrofitting the retrofit mining haul truck.

28 Claims, 27 Drawing Sheets

(51) Int. Cl.
    *H01M 8/04082*     (2016.01)
    *H01M 16/00*     (2006.01)
    *B60K 1/00*     (2006.01)

(52) U.S. Cl.
    CPC ..... *H01M 16/006* (2013.01); *B60K 2001/005* (2013.01); *B60K 2001/0405* (2013.01); *H01M 2220/20* (2013.01); *H01M 2250/20* (2013.01)

(56) References Cited

U.S. PATENT DOCUMENTS

| | | | |
|---|---|---|---|
| 7,681,676 B2* | 3/2010 | Kydd | B60K 6/48 |
| | | | 180/65.21 |
| 7,966,945 B1 | 6/2011 | Miller et al. | |
| 8,011,461 B2* | 9/2011 | Rodriguez | B60L 50/40 |
| | | | 477/3 |
| 8,596,391 B2* | 12/2013 | Kshatriya | B60W 20/00 |
| | | | 29/401.1 |
| 8,950,378 B2 | 2/2015 | Holt et al. | |
| 9,308,810 B1* | 4/2016 | Kurdy | B60K 7/00 |
| 9,457,792 B2* | 10/2016 | Bradley | B60K 6/547 |
| 11,351,850 B1* | 6/2022 | Calandruccio | B60K 17/16 |
| 2002/0168556 A1 | 11/2002 | Leboe et al. | |
| 2003/0207156 A1 | 11/2003 | Ovshinsky et al. | |
| 2004/0018399 A1 | 1/2004 | Jung | |
| 2004/0110050 A1 | 6/2004 | Abd Elhamid et al. | |
| 2004/0129466 A1 | 7/2004 | Leifert | |
| 2004/0188154 A1 | 9/2004 | Carlson | |
| 2005/0008904 A1 | 1/2005 | Suppes | |
| 2005/0044853 A1 | 3/2005 | Yoshino | |
| 2005/0100767 A1 | 5/2005 | Stolmar | |
| 2006/0000650 A1* | 1/2006 | Hughey | B60L 7/12 |
| | | | 180/65.25 |
| 2006/0266255 A1 | 11/2006 | Donnelly et al. | |
| 2007/0138006 A1 | 6/2007 | Oakes et al. | |
| 2009/0223725 A1* | 9/2009 | Rodriguez | B60L 7/14 |
| | | | 180/65.21 |
| 2011/0214930 A1 | 9/2011 | Betts et al. | |
| 2013/0065090 A1 | 3/2013 | Kazuno et al. | |
| 2015/0298538 A1 | 10/2015 | Janarthanam et al. | |
| 2018/0219267 A1 | 8/2018 | Martin et al. | |
| 2019/0152309 A1 | 5/2019 | Roper | |
| 2019/0160963 A1 | 5/2019 | Yoon et al. | |
| 2020/0207377 A1 | 7/2020 | Schuhholz et al. | |
| 2020/0249035 A1 | 8/2020 | Gitz | |
| 2022/0105791 A1 | 4/2022 | Hendriks et al. | |
| 2022/0169129 A1 | 6/2022 | Soles et al. | |
| 2022/0173459 A1 | 6/2022 | Soles et al. | |
| 2023/0339308 A1 | 10/2023 | Sweere et al. | |

FOREIGN PATENT DOCUMENTS

| | | | |
|---|---|---|---|
| CN | 106129298 A | 11/2016 | |
| CN | 107161016 A | 9/2017 | |
| CN | 110217116 A | 9/2019 | |
| CN | 110861481 A | 3/2020 | |
| CN | 212219927 U | 12/2020 | |
| CN | 214001306 U | 8/2021 | |
| EP | 1675200 A2 | 6/2006 | |
| EP | 1923288 A2 | 5/2008 | |
| EP | 2347926 A1 | 7/2011 | |
| EP | 3421279 A1 | 1/2019 | |
| GB | 2587666 A | 4/2021 | |
| JP | 2005329818 A | 12/2005 | |
| JP | 2010211942 A | 9/2010 | |
| KR | 20180138001 A | 12/2018 | |
| KR | 102353924 B1 | 1/2022 | |
| WO | WO-2005063520 A1 | 7/2005 | |
| WO | WO-2007050149 A1 | 5/2007 | |
| WO | WO-2021064010 A1 | 4/2021 | |
| WO | WO-2023164756 A1 * | 9/2023 | |
| WO | WO 2023/212528 A1 | 11/2023 | |

OTHER PUBLICATIONS

GB 1914406.2, Letter regarding Search report dated Dec. 1, 2020—1 page—English.
GB 1914406.2, Search Report dated Apr. 3, 2020, 2 pages—English.
GB 1914406.2, Search Report dated Nov. 30, 2020, 2 pages—English.
GB Office Action for GB Application No. GB1914406.2, dated Apr. 28, 2023, 6 pages.
International Search Report and Written Opinion for PCT Application No. PCT/US2023/066129 dated Aug. 30, 2023, 14 pages.
Non Final Office Action for U.S. Appl. No. 17/675,303, dated Jun. 17, 2022, 11 pages.
Non-Final Office Action for U.S. Appl. No. 18/180,042 dated Sep. 14, 2023, 7 pages.
PCT/EP2020/077348, International Search Report and Written Opinion dated Mar. 25, 2021, 17 pages combined—English.
PCT/EP2020/077348, Invitation to Pay Fees and Invitation relating to Partial International Search dated Jan. 15, 2021, 13 pages—English.

* cited by examiner

```
                                    10

┌─────────────────────────────────────────────────────────────────┐
│ Remove, from a frame of a haul truck, (a) a combustion engine   │
│ and an alternator from an engine bay, (b) a fuel tank from a    │
│ first wheel pocket, and (c) a hydraulic fluid reservoir from a  │
│ second wheel pocket to create at least a portion of a set of    │
│ available volumes                                                │
│                              11                                  │
└─────────────────────────────────────────────────────────────────┘
                                │
                                ▼
┌─────────────────────────────────────────────────────────────────┐
│ Install the hydraulic fluid reservoir in a rear axle pocket of   │
│ the haul truck                                                   │
│                              12                                  │
└─────────────────────────────────────────────────────────────────┘
                                │
                                ▼
┌─────────────────────────────────────────────────────────────────┐
│ Install at least a portion of a fuel cell system, a battery      │
│ system, or a liquid hydrogen storage system (LHSS) in at least   │
│ one of the available volumes                                     │
│                              13                                  │
└─────────────────────────────────────────────────────────────────┘
```

FIG. 14

RECONFIGURATION OF COMBUSTION ENGINE POWERED HAUL TRUCK WITH HYBRID HYDROGEN FUEL CELL AND BATTERY POWER SUPPLY

CROSS-REFERENCE TO RELATED APPLICATIONS

This application claims priority to and the benefit of U.S. Provisional Patent Application No. 63/586,253, filed Sep. 28, 2023, entitled "Reconfiguration of Diesel-Powered Haul Truck with Hybrid Hydrogen Fuel Cell and Battery Power Supply," the disclosure of which is incorporated herein by reference in its entirety.

This application is related to U.S. patent application Ser. No. 18/180,042, filed Mar. 7, 2023, entitled "Reconfiguration of Diesel-Powered Haul Truck with Hybrid Hydrogen Fuel Cell and Battery Power Supply," which claims priority to and the benefit of U.S. Provisional Application No. 63/334,297, filed Apr. 25, 2022, entitled "Reconfiguration of Diesel-Powered Haul Truck with Hybrid Hydrogen Fuel Cell and Battery Power Supply," the disclosure of each of which is incorporated herein by reference in its entirety.

BACKGROUND

Embodiments described herein are related to mining haul trucks and more particularly, to mining haul trucks that have been retrofitted to replace the components of a carbon fuel-based powerplant with components of a hybrid hydrogen fuel cell/battery-based powerplant.

Components of a carbon fuel-based powerplant can include a carbon (e.g., hydrocarbon) fueled internal combustion engine, generator(s) or alternator(s) driven by the engine to supply electrical energy to drive motors for the truck, fuel system components (storage tank(s), supply lines, filters, etc.), engine exhaust components, engine coolant systems (including water-based coolant storage, piping, radiator(s), etc.), engine lubrication/cooling oil systems (including oil storage, piping, radiator(s), etc.) and control systems/components.

Components of a hybrid hydrogen fuel cell/battery-based powerplant can include a hydrogen fuel system (which can include hydrogen storage tank(s), pumps, pressure regulators, coolers, vaporizers (heat exchangers) etc.), fuel cell stacks/modules, batteries, coolant systems for the fuel cells and batteries (including coolant storage, piping, heat exchangers/radiator(s), etc.), power electronics, and control systems/components.

Cost-effective operation of a mining haul truck generally requires high utilization rates, or the proportion of an operation period at a mining site during which the haul truck is in active use. A typical combustion engine powered (e.g., diesel-powered) haul truck can carry enough fuel (e.g., diesel fuel) to operate continuously for a full operation period (e.g., a full work shift for a driver of the truck), such that relatively little time is lost (or little reduction in utilization rate) due to time required to refill the truck's fuel storage tank(s). While hydrogen has the highest gravimetric (mass) energy density of all known substances, carbon-based fuels such as diesel have a significantly higher volumetric energy density than hydrogen (whether in highly pressurized gaseous form or in liquid form). As such, substantially greater storage volume on the truck is used for hydrogen fuel than is used for typical diesel fuel to enable the same operating duration for the truck. Hydrogen storage tanks, fuel cells, and batteries (and associated systems) all entail different considerations for placement on a haul truck than the considerations for the components of a diesel fuel-based powerplant (engine, diesel fuel tank(s), etc.).

There is therefore a need to optimize the placement and relative volumes allocated to each of the components of a hybrid hydrogen fuel cell/battery-based powerplant on a mining haul truck. A "clean sheet" design for a mining haul truck powered by a hybrid hydrogen fuel cell/battery-based powerplant, would entail substantial expense and long lead times before such trucks could be deployed in volume to mining sites, delaying the environmental and cost benefits of powering such vehicles with hydrogen generated from renewable energy sources rather than with fossil fuels such as diesel. It would therefore be desirable to retrofit existing mining haul trucks by removing the components of their carbon fuel-based (e.g., diesel) powerplants with components of hybrid hydrogen fuel cell/battery-based powerplants, which would enable earlier deployment of such trucks. The optimization of the placement and relative volumes for each of the components of the hybrid hydrogen fuel cell/battery-based powerplant is therefore constrained, at least in part, by the geometry and/or structures of the existing mining haul truck and the volumes of or within the truck that become available when the components of the carbon fuel-based powerplant are removed, and optionally when other components (not part of the powerplant) are relocated or redistributed.

SUMMARY

Embodiments described herein are related to retrofitting of currently available combustion engine powered mining haul trucks with hybrid hydrogen fuel cell/battery-based powerplants. In one aspect, the present disclosure provides a retrofit mining haul truck including a hybrid hydrogen fuel cell/battery-based powerplant in place of a carbon fuel-based powerplant. The retrofit mining haul truck includes a frame, a tray coupled to the frame, and a deck coupled to the frame forward of at least a portion of the tray. A battery system is mounted to the deck of the retrofit mining haul truck. A hydrogen storage system (HSS) is installed in an engine bay volume of the retrofit mining haul truck. The engine bay was configured to contain a combustion engine prior to retrofitting the retrofit mining haul truck (e.g., a diesel engine). At least a portion of a fuel cell system is installed in a wheel pocket of the retrofit mining haul truck. The wheel pocket was configured to contain a fuel tank prior to retrofitting the retrofit mining haul truck.

In one aspect, the present disclosure provides a method of retrofitting a combustion engine powered mining haul truck with a hybrid hydrogen fuel cell/battery-based powerplant. The method includes removing, from a frame of the haul truck, (a) a combustion engine and an alternator from an engine bay, (b) a fuel tank from a first wheel pocket, and (c) a hydraulic fluid reservoir from a second wheel pocket to create at least a portion of a plurality of available volumes. The hydraulic fluid reservoir is installed in a rear axle pocket of the haul truck. The method further includes installing at least a portion of a fuel cell system, a battery system, or a liquid hydrogen storage system (LHSS) in at least one of the available volumes.

In one aspect, the present disclosure provides a method of retrofitting a combustion engine powered mining haul truck with a hybrid hydrogen fuel cell/battery-based powerplant. The method includes removing a combustion engine-based powerplant from an engine bay of the haul truck, removing a fuel tank from a first wheel pocket, and removing a hydraulic fluid reservoir from a second wheel pocket. A liquid hydrogen storage system (LHSS) is installed in the engine bay, a first portion of a fuel cell system is installed in the first wheel pocket, and a second portion of the fuel cell system is installed in the second wheel pocket. The method further includes installing a battery system on a deck of the haul truck.

BRIEF DESCRIPTION OF THE DRAWINGS

FIG. 14 is a flowchart illustrating a method of retrofitting a combustion engine powered mining haul truck with a hybrid hydrogen fuel cell/battery-based powerplant, according to an embodiment.

DETAILED DESCRIPTION

Figure 1A:
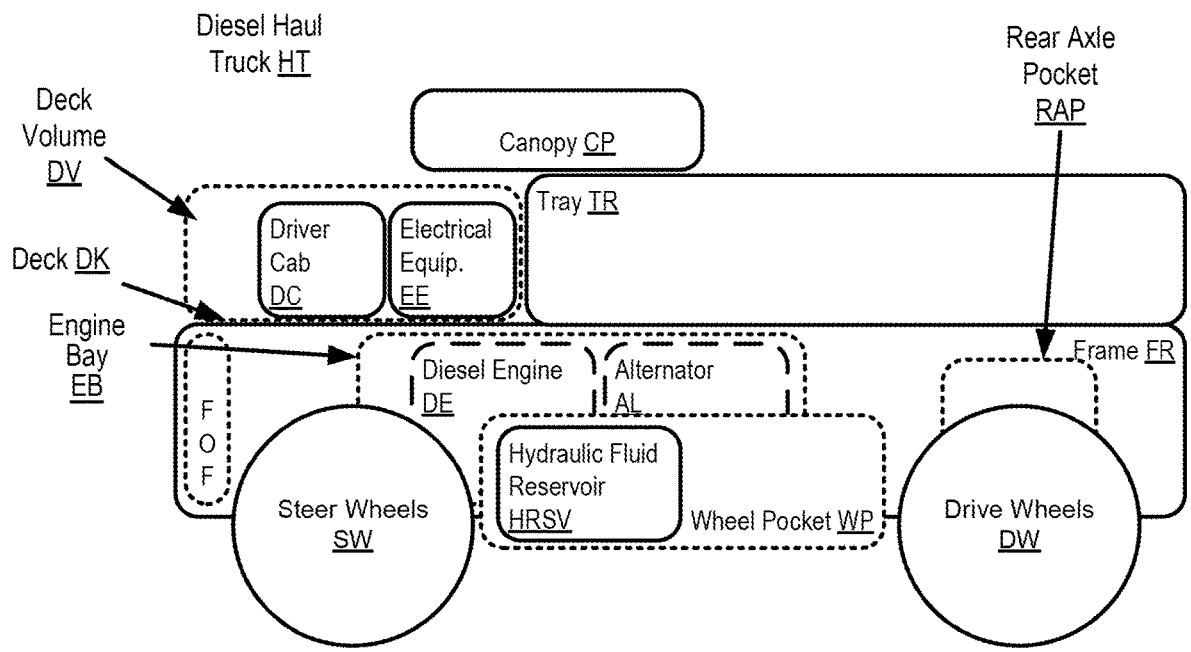
FIGS. 1A and 1B are a schematic side view illustration and a schematic top view illustration, respectively, of a known mining haul truck with a diesel fuel-based powerplant, or diesel haul truck.

The present disclosure provides a mining haul truck retrofitted with a hybrid hydrogen fuel cell/battery-based powerplant. In addition, the present disclosure provides a process for retrofitting a currently available carbon-fuel—powered mining haul truck with a hybrid hydrogen fuel cell/battery-based powerplant.

The terminology used herein is for the purpose of describing particular embodiments only and is not intended to limit the full scope of any embodiment and/or the full scope of the claims. Unless defined otherwise, all technical, industrial, and/or scientific terms used herein are intended to have the same meaning as commonly understood by one of ordinary skill in the art.

As used herein, the singular forms "a," "an," and "the" are intended to include the plural forms as well, unless the context clearly indicates otherwise. With respect to the use of singular and/or plural terms herein, those having skill in the art can translate from the singular to the plurality and/or vice versa as is appropriate for the context and/or application. Furthermore, any reference herein to a singular component, feature, aspect, etc. is not intended to imply the exclusion of more than one such component, feature, aspect, etc. (and/or vice versa) unless expressly stated otherwise.

As used herein, the terms "substantially," "approximately," and "about" used throughout this Specification and the claims generally mean plus or minus 10% of the value stated (e.g., about 100 would include 90 to 110).

In general, terms used herein and in the appended claims are generally intended as "open" terms unless expressly stated otherwise. For example, the term "including" should be interpreted as "including but not limited to," the term "having" should be interpreted as "having at least," etc. Similarly, the term "comprising" may specify the presence of stated features, elements, components, integers (or fractions thereof), steps, operations, and/or the like but does not preclude the presence or addition of one or more other features, elements, components, integers (or fractions thereof), steps, operations, and/or the like unless such combinations are otherwise mutually exclusive.

As used herein the term "and/or" includes any and all combinations of one or more of the associated listed items. It should be understood that any suitable disjunctive word and/or phrase presenting two or more alternative terms, whether in the written description or claims, contemplate the possibilities of including one of the terms, either of the terms, or both terms. For example, the phrase "A and/or B" will be understood to include the possibilities of "A" alone, "B" alone, or a combination of "A and B."

All ranges described herein include each individual member or value and are intended to encompass any and all possible subranges and combinations of subranges thereof unless expressly stated otherwise. Any listed range should be recognized as sufficiently describing and enabling the same range being broken down into at least equal subparts unless expressly stated otherwise.

Embodiments described herein relate generally to retrofitting of currently available haul trucks to replace, for example, combustion engine-based powerplants with hybrid hydrogen fuel cell/battery-based powerplants. Existing examples of such haul trucks include, but are not limited to, BelAZ models 75600 and 75710, BH model 205E, Bucyrus model MT6300AC, Caterpillar models 785, 794 AC, and 797, DAC model 120 DE Komatsu models 830E, 930E, 960E-1, and 980E-4, Liebherr model T 282B, Terex model 33-19, and XCMG model XDE400.

In general, currently available haul trucks are designed and built for use with combustion engines configured to burn carbon-based fuels, most commonly, diesel fuel. Diesel-based powerplants, for example, include an internal combustion engine, generator(s) or alternator(s) driven by the engine to supply electrical energy to drive motors for the truck, fuel system components (storage tank(s), supply lines, filters, etc.), engine exhaust components, engine coolant systems (including water-based coolant storage, piping, radiator(s), etc.), engine lubrication/cooling oil systems (including oil storage, piping, radiator(s), etc.) and control systems/components.

Embodiments described herein generally refer to retrofitting diesel-powered haul trucks for at least the reason that haul trucks having a diesel-based powerplant are by far the most prevalent in the industry. It should be understood, however, that the embodiments and/or methods described herein are presented by way of example only and not limitation. Accordingly, the concepts of using volumes or space of the haul truck that are made available by the removal and/or relocation of previous components is not intended to be limited to the specific implementation of retrofitting a haul truck that originally included a diesel-based powerplant. For example, the retrofit concepts and/or processes (or at least portions thereof) can be applied to haul trucks designed, configured, and/or built for use with any suitable powerplant. Such powerplants can include, for example, a combustion engine configured to burn any suitable carbon-based fuel such as diesel, natural gas, biodiesel, ethanol, etc.

Similarly, the retrofit concepts and/or processes (or at least portions thereof) can be applied to haul trucks designed, configured, and/or built with alternative powerplants such as, for example, battery-only (all electric) powerplants, battery-diesel hybrid powerplants, and/or any other powerplant. In other words, the retrofitting concepts and/or methods described herein can include removing and/or relocating previously existing components of any suitable powerplant, identifying volumes and/or spaces made available by such removals/relocations, and installing components of replacement and/or preferred powerplant such as, for example, a hybrid hydrogen fuel cell/battery powerplant.

Any of the embodiments described herein can implemented in stages separated by any suitable length of time. For example, in some implementations, a haul truck may be designed and built for use with a diesel-based powerplant. Retrofitting such a haul truck may include, for example, an intermediate step of adapting or retrofitting the haul truck to include a diesel/battery hybrid. In some such implementations, portions of a retrofit process may be performed to remove and/or relocate components of the original diesel powerplant to make available volumes and/or spaces for components of the diesel/battery hybrid powerplant such as, for example, additional batteries. In some instances, the haul truck may be operated and/or otherwise in active use for a given time prior to one or more additional retrofitting processes being performed. For example, after retrofitting the diesel-power-only haul truck to a diesel/battery hybrid, it may be desirable to retrofit the diesel/battery hybrid to a hydrogen fuel cell/battery hybrid. In such instances, the retrofitting process may include removing the combustion engine and any additional components of the diesel-based powerplant, cooling system, fuel storage, etc., and installing in the now-available volumes and/or spaces of the truck components of a hydrogen fuel cell system, hydrogen storage system, cooling system, and/or the like. Furthermore, with the intermediate retrofitting of the truck into the diesel/battery hybrid configuration, it may be such that the existing location of the battery system is suitable for use in the hydrogen fuel cell/battery hybrid configuration. Accordingly, the subsequent steps in the retrofit may only include electrically connecting the existing battery system to one or more of the retrofit components. Alternatively, it may be desirable to remove and/or relocate the battery system, supplement the battery system with additional or higher performing battery system(s), and/or otherwise make material changes to the battery system used in the diesel/battery hybrid configuration.

As another example, a haul truck may be designed and built for use with a combustion-engine-based powerplant and retrofit (in one or more steps or processes) to a battery-only (all electric) configuration. In such implementations, the retrofit process can include removing components associated with the existing powerplant and identifying volumes and/or spaces made available due to their removal. Once the volumes and/or spaces are identified, components associated with the replacement or retrofit powerplant (e.g., a battery-based and/or all electric powerplant) can be installed. In some instances, it may be desirable to perform additional or subsequent steps or processes to retrofit the haul truck having the battery-based powerplant to include components of a hybrid hydrogen fuel cell/battery powerplant. In such instances, volumes and/or spaced for the hydrogen fuel cell components may be made available by removal of one or more portions of the battery system. In other implementations, a diesel-powered haul truck may be retrofit to include a hybrid hydrogen fuel cell/battery powerplant and subsequently retrofit from the hybrid hydrogen fuel cell/battery configuration to a battery-only (or all-electric) configuration.

Figure 1B:
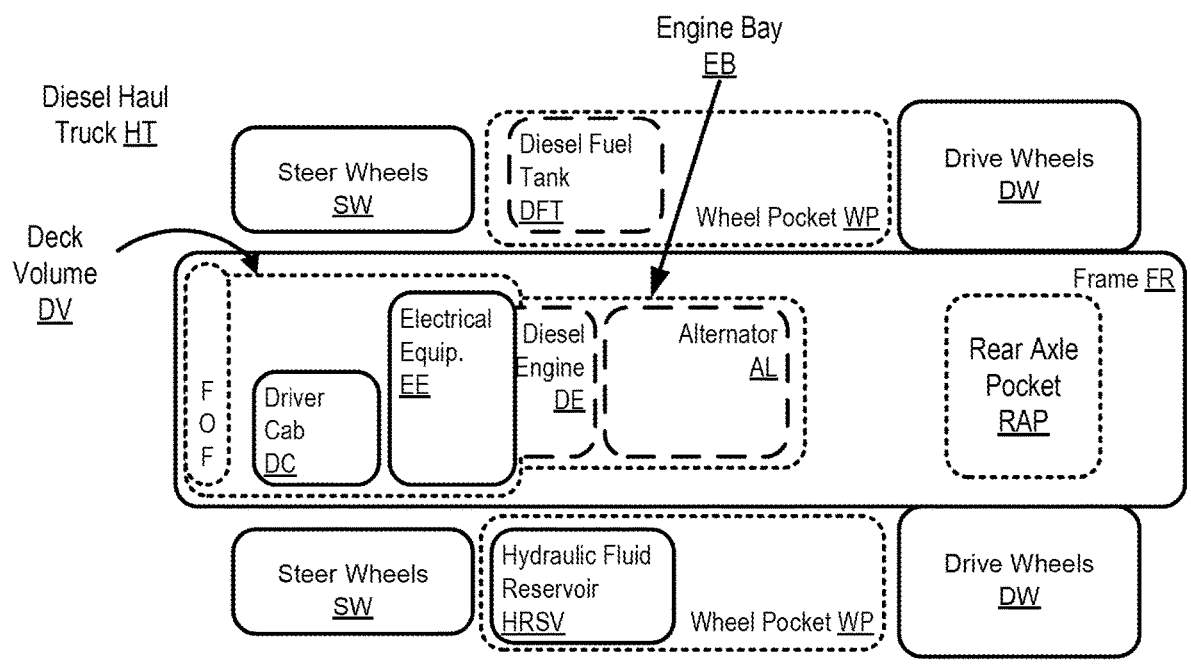

FIGS. 1A and 1B are schematic illustrations showing a side view and a top view, respectively, of a currently available diesel haul truck HT. The diesel haul truck HT includes a frame FR supported on two steer wheels SW, and two sets of drive wheels DW, and a tray TR supported on the frame FR and having a canopy CP extending from the front portion thereof over a deck DK. A driver cab DC and electrical equipment EE are supported on the deck DK. A hydraulic fluid reservoir HRSV is supported on the frame. These components are shown in solid lines in FIGS. 1A and 1B to indicate that they are components of haul truck HT that are independent of the diesel based powerplant, and may therefore also be included in a haul truck with a hybrid hydrogen fuel-cell/battery based powerplant.

Several volumes are defined by the components of the haul truck HT (identified by dotted lines in FIGS. 1A and 1B and subsequent figures), including, for example, an engine bay EB bounded by the frame FR, and below the tray TR; a wheel pocket WP on each side of the haul truck HT, between the steer wheels SW and the drive wheels DW and outward of the frame FR; a deck volume DV between the deck DK and the canopy CP; a rear axle pocket RAP bounded by the frame FR and the rear axle (not shown) and below the tray TR; and a front of frame volume FOF at the front of haul truck HT.

Components of the conventional diesel fueled powerplant (indicated by dashed lines in FIGS. 1A and 1B and subsequent figures) are distributed among the available volumes. A diesel engine DE is drivingly coupled to an alternator AL to generate electrical power to be supplied to motors (not shown) to drive the drive wheels DW—both the diesel engine DE and the alternator AL are disposed in the engine bay EB. Diesel fuel for the diesel engine DC is stored in diesel fuel tank DFT, which is disposed on one of the wheel pockets WP. The diesel engine DE is cooled by coolant fluid circulated through a radiator (not shown) disposed in the front of frame volume FOF, in which position the radiator is directly exposed to ambient air around the haul truck HT, the flow of which air through the radiator can be enhanced by fans (not shown).

Figure 2A:
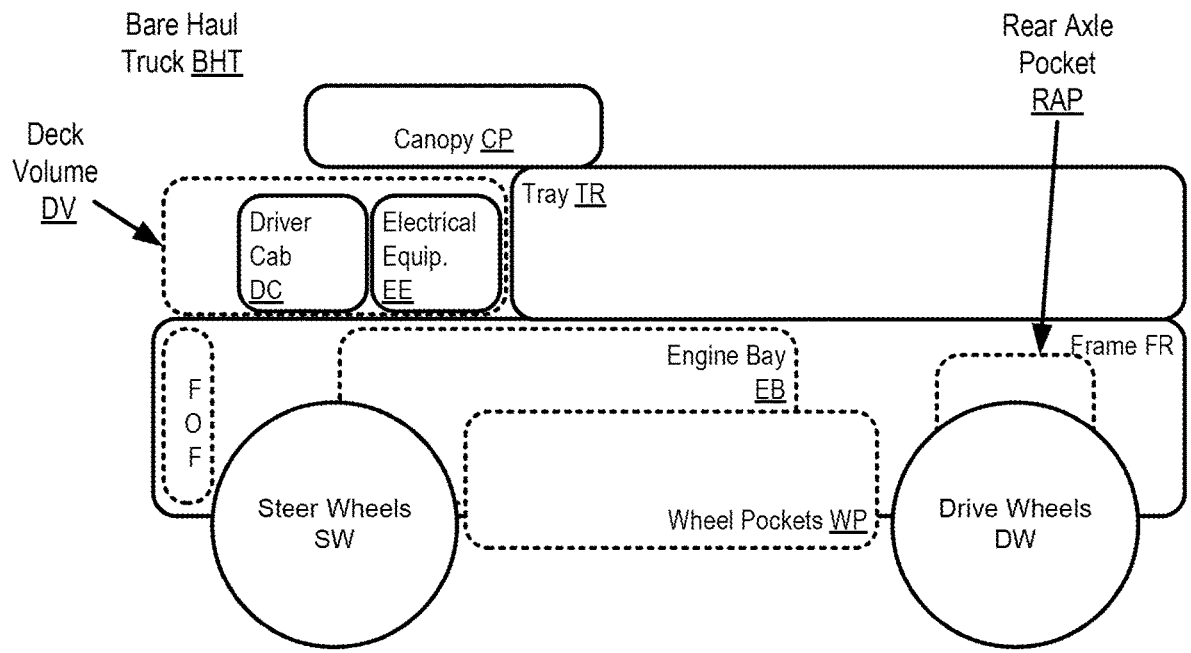
FIGS. 2A and 2B are a schematic side view illustration and a schematic top view illustration, respectively, of the mining haul truck of FIGS. 1A and 1B with the components of the diesel fuel-based powerplant removed (referred to as a bare haul truck).
Figure 2B:
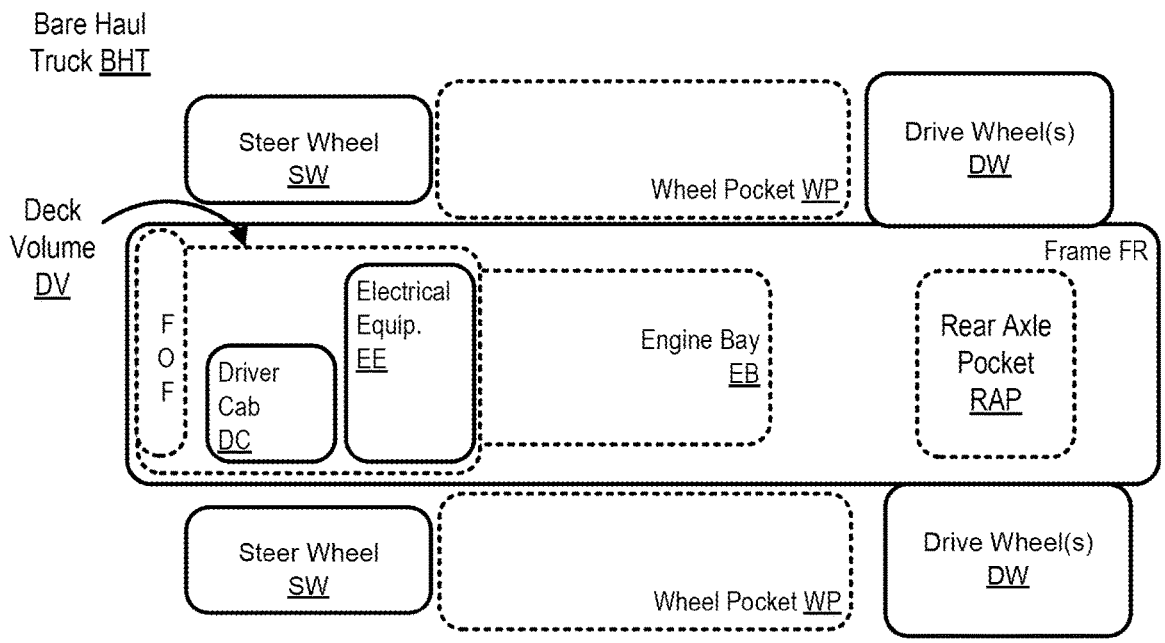

To prepare a haul truck HT for conversion from a diesel fuel-based powerplant to a hybrid hydrogen fuel cell/battery-based powerplant, the components of the diesel fuel-based powerplant are removed from the haul truck HT. These components includes the diesel engine DE, alternator AL, diesel fuel tank DFT, radiator, and other components not shown or described in detail above, including other diesel fuel system components (supply lines, filters, etc.), engine exhaust components, other engine coolant system components (including water-based coolant storage, piping, radiator(s), etc.), engine lubrication/cooling oil systems (including oil storage, piping, radiator(s), etc.) and powerplant control systems/components. Optionally, additional components that are not specific to the diesel fuel-based powerplant but instead are, or may be, applicable to a haul truck regardless of the powerplant, may be relocated or removed. One such component is the hydraulic reservoir HRSV, which may subsequently be relocated to a different available volume in its original configuration, or may be reconfigured so that it can be disposed in other available volumes that would not accommodate the original configuration. Other components that may be reconfigured and/or relocated include the drive cabinet and the hydraulic steering and/or braking accumulators. Another such component is the driver cab DC—as discussed below, the reconfiguration of the truck may include substituting an autonomous operation control system for the human driver, and the removal of the driver cab can increase the size of the deck volume DV. These changes result in a bare haul truck BHT, shown schematically in FIGS. 2A and 2B (with the hydraulic fluid reservoir HRSV removed, but the drive cabinet, hydraulic reservoirs and driver cab DC retained, in this example).

The bare haul truck BHT has the same fixed components (particularly frame FR, steer wheels SW, and drive wheels DW), and has the volumes described above, but those volumes are now empty and available to receive the components of the hybrid hydrogen fuel cell/battery-based powerplant. Although the canopy CP and tray TR are essential components of a haul truck, and are shown schematically in FIGS. 2A and 2B as being the same configuration as on the unmodified from the original diesel haul truck HT, these components may also be reconfigured for use with the hybrid hydrogen fuel cell/battery based powerplant haul truck (e.g., to create additional volume to accommodate components of the hybrid powerplant, as described in more detail below). Similarly, as shown in this example, the hydraulic fluid reservoir HRSV can be removed from one of the wheel pockets WP, increasing the available volume of the wheel pocket WP, and can be relocated, and optionally reconfigured. Additionally, although the driver cab DC is indicated (by a solid line) as being a fixed component of the haul truck, it is also contemplated that in some embodiments a haul truck can be operated remotely, or autonomously (i.e., without a human operator on the haul truck), and thus driver cab DC can be removed or omitted to free up additional volume within the deck volume DV.

Although the process of preparing a haul truck for a hybrid hydrogen fuel cell/battery-based powerplant is described herein as a retrofit process (i.e., by first removing the components of a diesel fuel based powerplant), it is also contemplated that a bare haul truck BHT could be procured from a haul truck manufacturer (i.e., without previously having had a diesel fuel based powerplant, or other optional or reconfigurable components described above, installed).

Figure 3A:
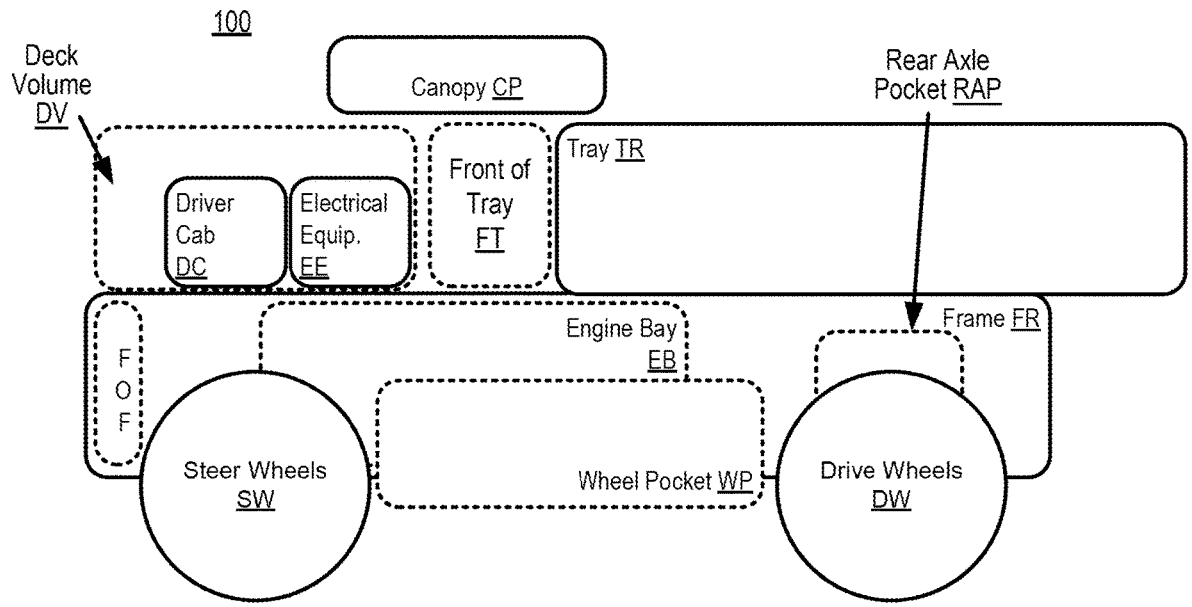
FIGS. 3A-3C are schematic illustrations showing a side view and a top view, respectively, of the components of a haul truck with a hybrid hydrogen fuel cell/battery-based powerplant, including the bare haul truck of FIGS. 2A and 2B (FIGS. 3A and 3B), and the components of a hybrid hydrogen fuel cell/battery-based powerplant to be disposed in the bare haul truck (FIG. 3C), according to an embodiment.
Figure 3B:
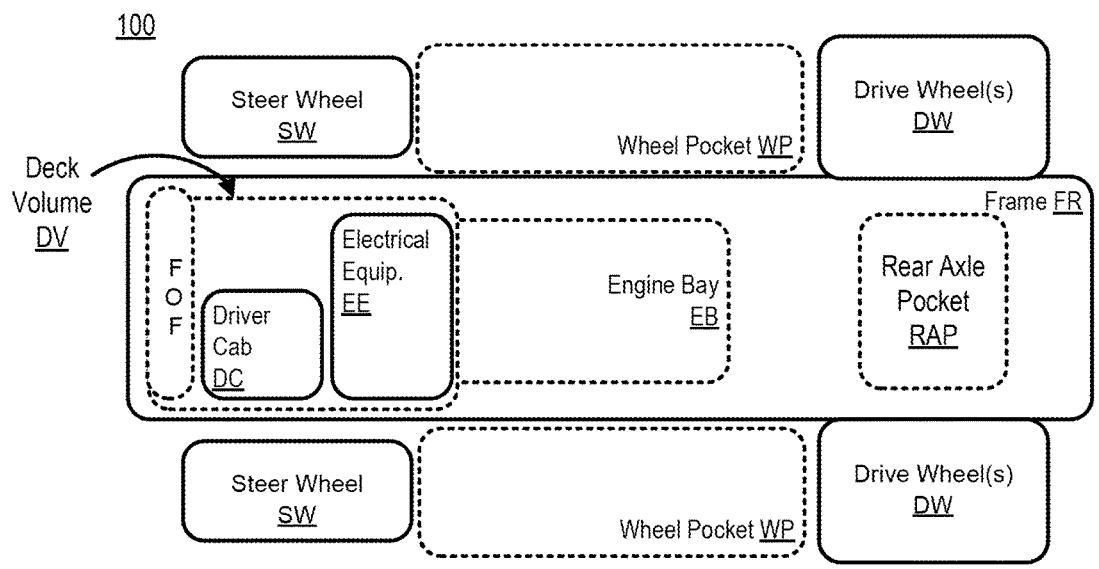
Figure 3C:
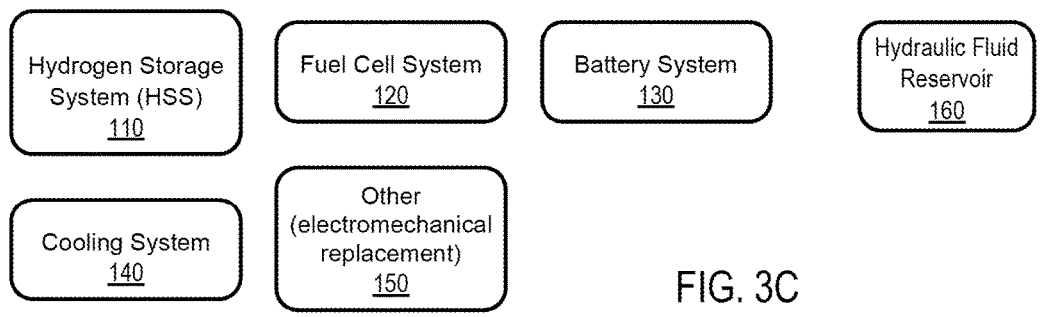

Once a bare haul truck BHT has been produced (or procured), the components of a hybrid hydrogen fuel cell/battery-based powerplant can be gathered together with the bare haul truck BHT to prepare for the assembly of a hybrid haul truck 100, as shown in FIGS. 3A-3C. The components of the hydrogen fuel cell/battery-based powerplant are shown schematically in FIG. 3C, and together with the other components of the haul truck 100 (as shown in FIGS. 3A and 3B) can be considered to a kit for a hybrid haul truck 100.

As shown schematically in FIG. 3C, the hybrid powerplant components include, for example, a hydrogen storage system (HSS) (either a compressed hydrogen storage system (CHSS) or liquid hydrogen storage system (LHSS)) 110, a fuel cell system 120, a battery system 130, a cooling system 140, and other components 150 (such as a traction converter that controls the flow of electricity from the battery system 130 and fuel cell system 120 onto the existing electrical bus or DC-Link of the truck, and to conduct electricity from the drive motors when in regenerative braking mode, back to the battery system 130, electric motors to drive auxiliary loads, power electronics, and other electronics and controls). Other components not included here that may consume available volume(s) can include supplementary routing components. In addition, a hydraulic fluid reservoir 160 (which may be of the same configuration as the hydraulic fluid reservoir HRSV from the original haul truck, or may be of different configuration) can be included.

The HSS 110 is configured to store hydrogen at suitable pressure(s) and/or temperatures (in gaseous or liquid form) for supply to fuel cell system 120. The HSS 110 may include one or more tanks configured to store the hydrogen at the desired pressure(s) (e.g., high pressure for compressed gaseous hydrogen) or temperatures (e.g., cryogenic temperature for liquid hydrogen). The size, geometry, and number of tanks can be selected to achieve the desired total storage volume desired, and/or to enable the desired location of the tank(s) in one or more of the available volumes on haul truck 100. In some embodiments, the HSS 110 includes at least 1, at least 2, at least 3, at least 4, or at least 5 tanks. In some embodiments, the HSS 110 includes no more than 20, no more than 18, no more than 16, no more than 14, or no more than 12 tanks. Combinations of the above-referenced ranges for the number of tanks are possible (e.g., 1-20 or 2-12). Each of multiple tanks may be of the same volume, geometry, and/or dimensions, or may vary in volume, geometry, or dimensions. If multiple tanks are to be disposed in a single volume, they may be disposed relative to each other in various arrangements, such as side-by-side or end-to-end, horizontally and/or vertically, in one or more rows, columns, or combinations thereof. Liquid hydrogen may be heated to a suitable temperature and pressure for receipt by the fuel cells by a series of vaporizers/heat exchangers. Optionally, a pump may additionally be used to pressurize the system.

The fuel cell system 120 includes one or more fuel cell stacks or modules, and associated components such as fuel cell boost converters and air delivery subsystem, and is configured to convert the hydrogen from the HSS 110 to electricity to provide energy/power to other components of the truck (e.g., drive motors and/or batteries). In some embodiments, the fuel cell system 120 includes at least 1, at least 2, at least 3, at least 4, or at least 5 fuel cells stacks or modules. In some embodiments, the fuel cell system 120 includes no more than 20, no more than 18, no more than 16, no more than 14, or no more than 12 fuel cell stacks or modules. Combinations of the above-referenced ranges for the number of fuel cells stacks or modules are possible (e.g., 1-20 or 2-12). Each of multiple fuel cell stacks or modules may be of the same volume, geometry, and/or dimensions, or may vary in volume, geometry, or dimensions. If multiple fuel cell stacks or modules are to be disposed in a single volume, they may be disposed relative to each other in various arrangements, such as side-by-side or end-to-end, horizontally and/or vertically, in one or more rows, columns, or combinations thereof.

The battery system 130 includes at least one battery and is configured to receive and store electrical energy produced from the fuel cell system 120 and/or from an external energy source, and to supply the stored electricity to provide energy/power to other components of the truck (e.g., the drive motors). In some embodiments, the battery system 130 includes a plurality of batteries. In some embodiments, the battery system 130 includes at least 1, at least 2, at least 3, at least 4, or at least 5 batteries. In some embodiments, the battery system 130 includes no more than 20, no more than 18, no more than 16, no more than 14, or no more than 12 batteries. Combinations of the above-referenced ranges for the number of batteries are possible (e.g., 1-20 or 2-12). Each of multiple batteries may be of the same volume, geometry, and/or dimensions, or may vary in volume, geometry, or dimensions. If multiple batteries are to be disposed in a single volume, they may be disposed relative to each other in various arrangements, such as side-by-side or end-to-end, horizontally and/or vertically, in one or more rows, columns, or combinations thereof.

The cooling system 140 is configured to cool the fuel cell system 120 and optionally the battery system 130. In some embodiments, the cooling system 140 includes a heat exchanger/radiator through which cooling fluid can circulated in a fluid loop that also passes through the fuel cell system 120 and optionally the battery system 130, or associated components. In some embodiments, the cooling system can also be used to heat liquid hydrogen (since the cooling fluid will be at temperatures substantially higher than that of the liquid hydrogen). In some embodiments, the cooling system 140 includes a coolant and a container for storing the coolant. Cooling system 140 can include more than one heat exchanger/radiator, such as a main radiator 142 for cooling the fuel cell system 120 and optionally other components such as chillers for the battery system 130, and one or more secondary radiators 144 for cooling other components of the truck, including, for example, the power electronics.

The other components 150 can include the traction converter described above, and optionally electromechanical replacements (e.g., new drive motor(s) to replace the original drive motor(s) from the haul truck).

As noted above, although the tray TR, canopy CP, and deck volume DV for haul truck 100 may be retained from the original haul truck HT (or bare haul truck BHT), in some embodiments the tray TR, deck and/or canopy CP may be modified or replaced to create additional volume for placement of component(s) of the hybrid powerplant. For example, the canopy CP can be raised (disposed a greater vertical distance from the deck DK) to increase the size of the deck volume DV. Similarly, the tray TR can be displaced rearwardly on the frame FR of the haul truck 100, or the deck and mounted electronics DV can be moved forwards, creating additional empty space in front of tray TR, and thereby creating an additional volume (front of tray FT) to receive component(s) of the hybrid powerplant.

Table 1 shows approximate sizes for each of the volumes in haul truck 100 (as shown in FIGS. 3A and 3B) that can receive the components of the hybrid hydrogen fuel cell/battery-based powerplant (as shown in FIG. 3C). These volumes are representative of those available in ultra class haul trucks, with payload capacities over 300 short tons.

TABLE 1

| Available Volumes | Size of Volume ($m^3$) |
| --- | --- |
| Deck volume DV | 27-37 (with potential for another 10 by raising canopy) |
| Front of tray FT | 8-16 |
| Front of frame FOF | 8-13 |
| Wheel pockets WP (each) | 5-12 |
| Engine bay EB | 22-25 |
| Rear axle pocket RAP | 2-3 |

Table 2 shows approximate required volumes, or specific volumes, for each of the components of the hybrid hydrogen fuel cell/battery-based powerplant and additional components. For CHSS 110, assuming that the hydrogen is in gaseous form and at 700 bar pressure, then the volume required is 70 liters (L), or 0.07 cubic meters ($m^3$), per kilogram (kg) of hydrogen.

TABLE 2

| Component | Required Volume |
| --- | --- |
| Hydrogen Storage System (HSS) 110 | |
| CHSS | 70 L (0.07 $m^3$)/kg gaseous $H_2$ at 700 bar |
| LHSS | 20-40 L (0.02-0.04. $m^3$)/kg liquid $H_2$ at 2-10 bar |
| Fuel cell system 120 | 85-125 kW/$m^3$ |
| Battery system 130 | 20-60 kWh/$m^3$ |
| Cooling system 140 | 10-15 $m^3$ |
| Other 150 | 3-10 $m^3$ |
| Hydraulic fluid reservoir 160 | 2-4 $m^3$ |

As noted above, each component of the hybrid powerplant shown in Table 2 can be disposed entirely in any one of the available volumes of the haul truck 100 shown in Table 1 (unless its minimum required volume is larger than the maximum size of the respective available volume). Further, each component of the hybrid powerplant can have its constituent parts or subcomponents disposed in two or more of the available volumes, and any available volume can include more than one component of the hybrid powerplant or the component's constituent parts or subcomponents. Additionally, non-powerplant components (such as the hydraulic fluid reservoir, in its original configuration or in a modified configuration) can be disposed in one or more of the available volumes.

Table 3 shows a matrix of available volumes and hybrid powerplant components, and the possibilities of which components (or its constituent parts or subcomponents) can be disposed in which volumes. In this matrix, possible locations are identified by a "Y," and relatively more preferred, or less preferred locations (based on the discussion below) are identified by a "MP" or "LP," respectively.

TABLE 3

| Volume/Component | HSS 110 | Fuel cell system 120 | Battery system 130 | Cooling system 140 | Other 150 | HRSV 160 |
|---|---|---|---|---|---|---|
| Deck volume DV | Y | Y | LP | Y | Y | Y |
| Front of tray FT | Y | Y | Y | LP | Y | Y |
| Front of frame FOF | LP | LP | LP | MP | Y | Y |
| Left wheel pocket WP | Y | LP | Y | Y | Y | Y |
| Right wheel pocket WP | Y | LP | Y | Y | Y | Y |
| Engine bay EB | Y | MP | Y | LP | Y | Y |
| Rear axle pocket RAP | LP | LP | LP | LP | Y | Y |

One or more design considerations can be taken into account when placing the components of a hybrid hydrogen fuel cell/battery-based powerplant into the available volumes of the haul truck 200. The design considerations include, but are not limited to, safety, ease of maintenance, energy efficiencies, cooling efficiencies, locations of components, volumetric priorities, and proportions.

In some embodiments, one design consideration relates to volumetric priorities. The HSS 110, the fuel cell system 120, and the battery system 130 each require a certain volume to provide desired output power (instantaneous and/or sustained) and/or to provide a desired total energy. The HSS 110 serves as energy storage in chemical form (hydrogen) and provides the hydrogen to the fuel cell system 120. The fuel cell system 120 provides electrical power to the drive motors and/or to the battery system 130, and is the primary source of sustained power for the drive motors to operate the haul truck 100 and the primary source of electrical energy to recharge the battery system 130. In some embodiments, the desired sustained power output for the fuel cell system 110 is that required for steady-state operation on level terrain while the haul truck 100 is carrying a load, and may preferably be comparable to the speed achieved by a diesel fuel-based powerplant. The battery system 130 generally supplements the output of the fuel cell system 110 to provide required instantaneous power output (e.g., for climbing a hill with a full load in the tray TR). In some embodiments, for example, the desired instantaneous power output can be that required to the haul truck 100 up a specified maximum grade at a minimum acceptable speed. The battery system 130 can also supplement the output of the fuel cell system 130 so that the collective output power, and energy supply, is that sufficient to cover the maximum operating elevation change at the mine site with a full load in the haul truck. For example, in some embodiments, it may be desired that the fuel cell system has the output power of about 800 kW or greater; and in some embodiments, it is desired that the battery system has output power of 2 MW or greater. In some embodiments, the amount of hydrogen stored in the HSS is sufficient to operate the haul truck 100 for a sufficient duration between refueling breaks.

In some applications (e.g., at some mine sites), the instantaneous power requirement may be relatively high (e.g., the mine site includes relatively steep grades in the terrain to be traversed by the haul truck 100 while hauling a full load), requiring that the battery system 130 be relatively larger. The required volume may be traded off against less volume for HSS 110 and/or fuel cell system 120 (e.g., if the total elevation change is relatively lower, and/or if a relatively shorter duration between refueling stops can be accepted). In one non-limiting example, in which a hybrid haul truck is configured to have a power output of 2,000 kW (comparable to the power output of the replaced diesel powerplant), and energy storage of 8,000 kWh, it is volumetrically favorable to have 225 kg of $H_2$ storage in HSS 110 (in gaseous form, with a volume of approximately 16.0 $m^3$), 1,400 kW power output from fuel cell system 120 (with a volume of approximately 11.0 $m^3$ to 16.0 $m^3$), and 500 kWh energy storage capacity in battery system 130 (with a volume of approximately 8.0 $m^3$ to 24.0 $m^3$). In another non-limiting example, in which a hybrid haul truck is configured to have a power output of 2,000 kW (comparable to the power output of the replaced diesel powerplant), and energy storage of 10,000 kWh, it is volumetrically favorable to have 300 kg of $H_2$ storage in HSS 110 (in liquid form, with a volume of approximately 13.0 $m^3$), 1,100 kW power output from fuel cell system 120 (with a volume of approximately 23.0 $m^3$), and 750 kWh energy storage capacity in battery system 130 (with a volume of approximately 22.0 $m^3$).

The cooling system 140 also takes up a certain volume to provide sufficient cooling for fuel cell system 120 and, optionally, battery system 130. A primary volumetric component of cooling system 140 can be a radiator. Since the waste heat from a fuel cell system can be substantially higher than that of a diesel engine for comparable power output, the radiator of the cooling system 140 can be substantially larger (e.g., at least 10%, at least 20%, at least 30%, at least 40%, or at least 50% larger) than the original radiator removed from the diesel haul truck.

In some embodiments, one design consideration relates to ease of maintenance. For example, the battery system 130 (or a portion thereof) can be disposed in locations in which they are relatively easy to access for repair, maintenance, or replacement, such as in the wheel pocket(s).

In some embodiments, one design consideration relates to energy efficiencies or reducing line losses. The components of a hybrid hydrogen fuel cell/battery-based powerplant are connected to facilitate the flow of electricity. Accordingly, in some embodiments, certain components may preferably be placed in relatively closer proximity to each other so that the current-carrying electrical lines are as short as possible. Relatedly, the integrity of hydrogen high pressure lines (e.g., between HSS 110 (for gaseous hydrogen) and fuel cell system 120) can be affected by vibrations generated by operation of haul truck 100, and it may therefore be desirable to arrange the HSS 110 and fuel cell system 120 so that the length of the connecting high pressure hydrogen lines are as short as possible.

In some embodiments, one design consideration relates to safety. Hydrogen is combustible, so it is known to present safety concerns. In some embodiments, the HSS 110 (or a portion thereof) may preferably be disposed in an upper portion of haul truck 100, so that hydrogen (which is much less dense than air) that is vented or escapes from the HSS 110 can more readily be dispersed in the atmosphere and not become trapped in pockets in overlying equipment, where it could pose a fire risk. In some embodiments, haul truck 100 can also include piping to provide access for refueling of the HSS 110. In some embodiments, the tray TR and/or canopy CP (e.g., their reinforcing ribs) may be perforated to facilitate hydrogen venting.

Another design consideration is the stability (static and/or dynamic) of the haul truck 100, and the effect of component location on stability. For example, both HSS 110 and battery system 130 can have significant total masses, and disposing either at a relatively high position on haul truck 100 (such as in in the deck volume DV or front of tray volume FT) can reduce dynamic stability (e.g., reduce resistance to tipping towards the outside of a turn, particularly at higher operating speeds and an unloaded condition of the truck). It may therefore be desirable to dispose such components in relatively lower locations, such as the wheel pocket(s) WP, front of tray and/or engine bay EB.

It may also be desirable to reduce the chance that sensitive electronics may be damaged, such as by exposure to cooling fluid. Accordingly, in some embodiments, the coolant of the cooling system may preferably be disposed above, or to the side, of such electronics so that any leaking coolant fluid does not fall onto the electronics.

Storage tanks suitable for use with HSS 110 may be relatively susceptible to damage (and ensuing leakage and associated hazards) by impact with hard objects, such as rocks or other equipment at a mine site. In some embodiments, it may therefore be desirable to dispose such tanks in locations in which they are relatively less likely to be exposed to such impacts—for example, such tanks may preferably be disposed in the deck volume DV and/or front of tray FT, rather than in wheel pocket(s) WP. In some embodiments, the risk of such impact damage to HSS 110 (and/or other components of the hybrid powerplant) can be reduced by incorporating a collision avoidance system into the haul truck 100.

In some embodiments, one design consideration relates to cooling efficiencies. For example, it can be beneficial to dispose the heat sources (particularly fuel cell system 120 but also battery system 130) in locations that are as close to the cooling system 140 and/or ambient air flow as possible, so that coolant lines are as short as possible.

Figure 4A:
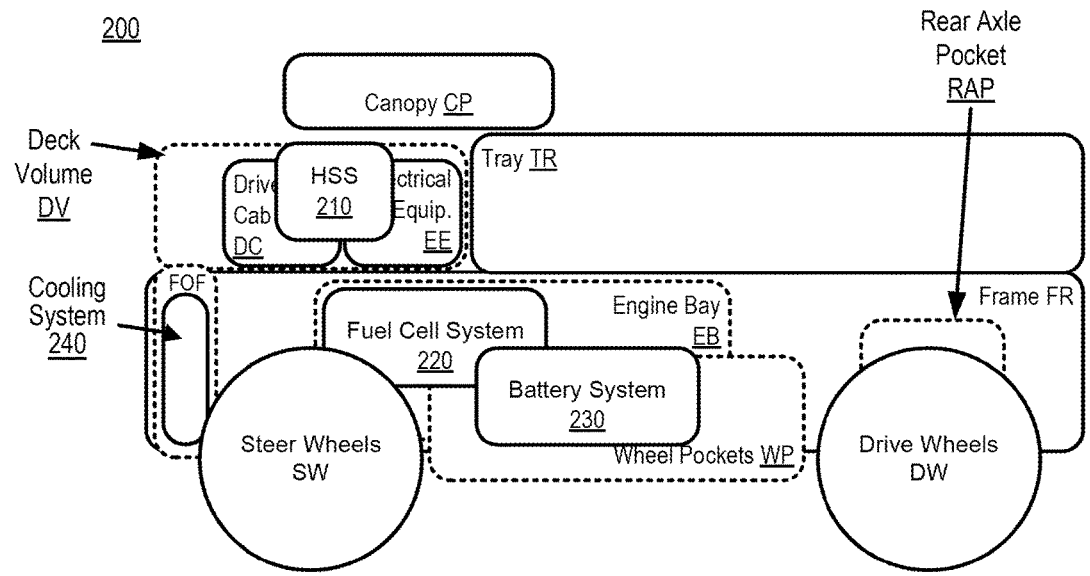
FIGS. 4A and 4B are schematic illustrations of a haul truck with a hybrid hydrogen fuel cell/battery-based powerplant, or hybrid haul truck, according to an embodiment.
Figure 4B:
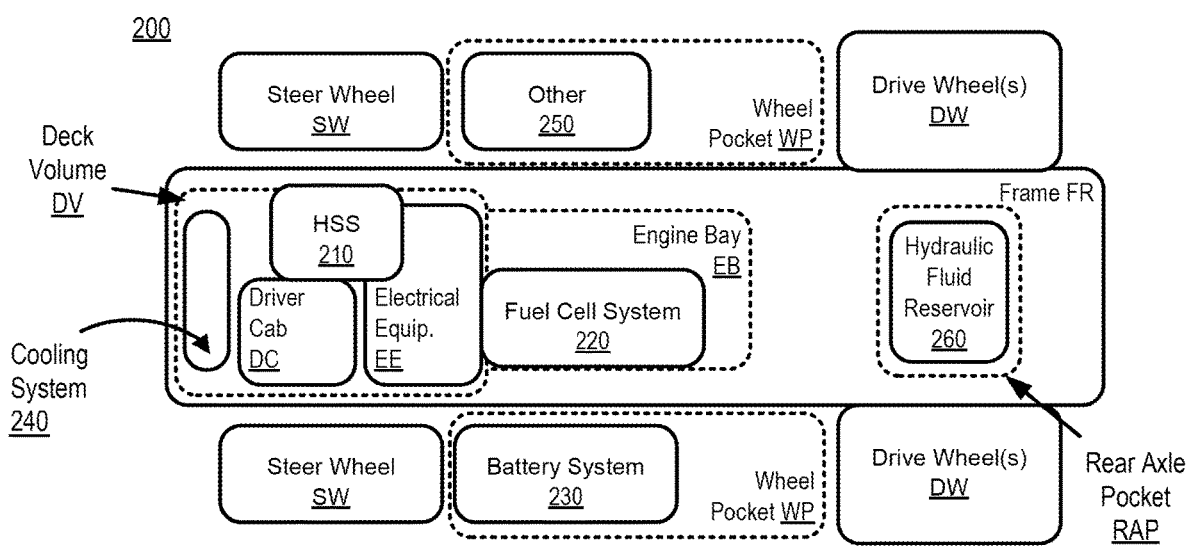

Example embodiments of haul trucks with various arrangements of hybrid powerplant components in the available volumes are described below. For example, FIGS. 4A and 4B are schematic illustrations showing a side view and a top view, respectively, of a haul truck 200 retrofitted with a hybrid hydrogen fuel cell/battery-based powerplant ("hybrid haul truck") according to an embodiment. In this embodiment, the tray TR and canopy CP are unmodified from the original haul truck, so that there is no additional front of tray volume. The hybrid haul truck 200 comprises a CHSS 210 disposed in the deck volume DV, a fuel cell system 220 disposed in the engine bay EB, a battery system 230 disposed in one of the wheel pockets WP, and a cooling system 240 (primarily the radiator) disposed in the front of the frame FOF. This arrangement of the hybrid haul truck 200 is also reflected in Table 4 below.

TABLE 4

| Volume/Component | CHSS 210 | Fuel cell system 220 | Battery system 230 | Cooling system 240 | Other 250 | HRSV 260 |
|---|---|---|---|---|---|---|
| Deck volume DV | Y | | | | | |
| Front of tray FT | | | | | | |
| Front of frame FOF | | | | Y | | |
| Left wheel pocket WP | | | Y | | | |
| Right wheel pocket WP | | | | | Y | |
| Engine bay EB | | Y | | | | |
| Rear axle pocket RAP | | | | | | Y |

Figure 5A:
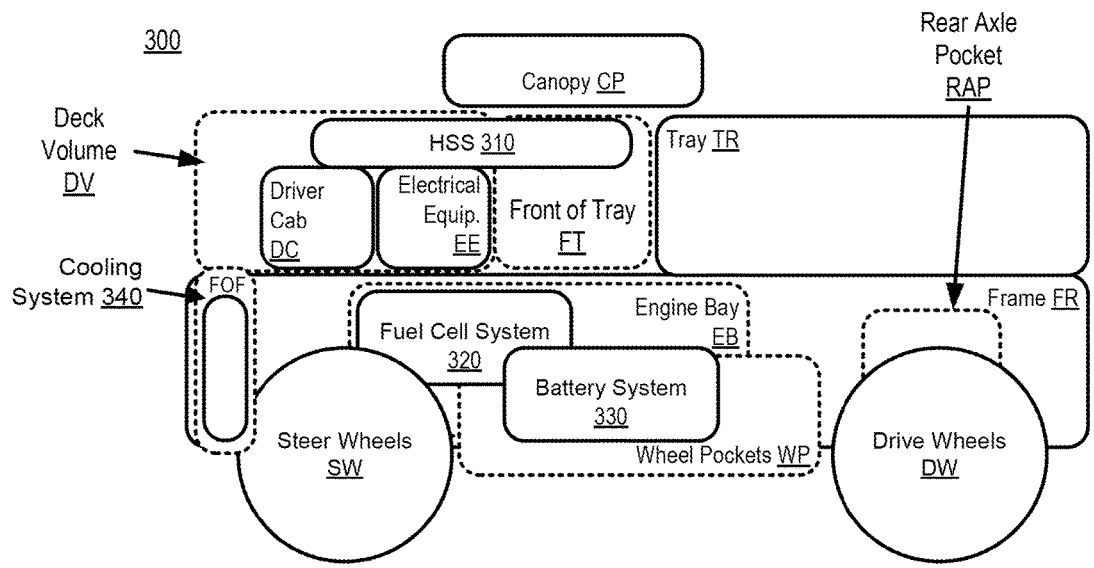
FIGS. 5A and 5B are schematic illustrations of a hybrid haul truck, according to an embodiment.
Figure 5B:
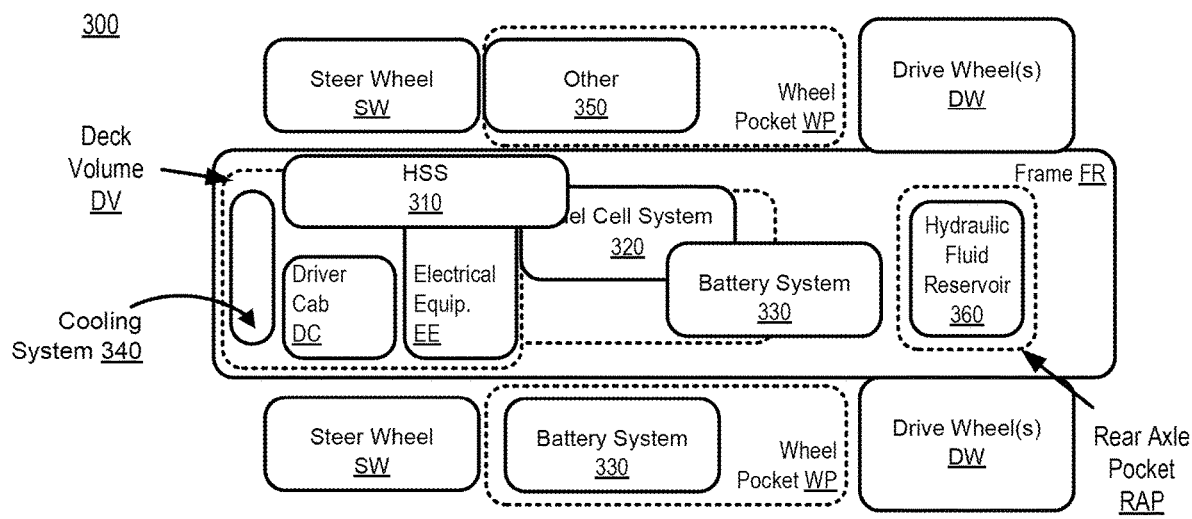

FIGS. 5A and 5B are schematic illustrations showing a side view and a top view, respectively, of a hybrid haul truck 300, according to an embodiment. The hybrid haul truck 300 has the same or similar components as the hybrid haul truck 200, except that the locations of certain components are different. Also in this embodiment, the tray TR and canopy CP are different than those components of the original haul truck, creating a front of tray volume FT. The hybrid haul truck 300 includes a CHSS 310 disposed in both the deck volume DV and the front of the tray FT, a fuel cell system 320 disposed in the powerplant bay, a battery system 330 disposed in both the engine bay EB and one of the wheel pockets, a cooling system 340 (primarily the radiator) disposed in the front of the frame FOF, and other 350 disposed in the other wheel pocket. This arrangement of the hybrid haul truck 300 is also reflected in Table 5 below.

TABLE 5

| Volume/Component | CHSS 310 | Fuel cell system 320 | Battery system 330 | Cooling system 340 | Other 350 | HRSV 360 |
|---|---|---|---|---|---|---|
| Deck volume DV | Y | | | | | |
| Front of tray FT | Y | | | | | |
| Front of frame FOF | | | | Y | | |
| Left wheel pocket WP | | | Y | | | |
| Right wheel pocket WP | | | | | Y | |
| Engine bay EB | | Y | Y | | | |
| Rear axle pocket RAP | | | | | | Y |

Figure 6A:
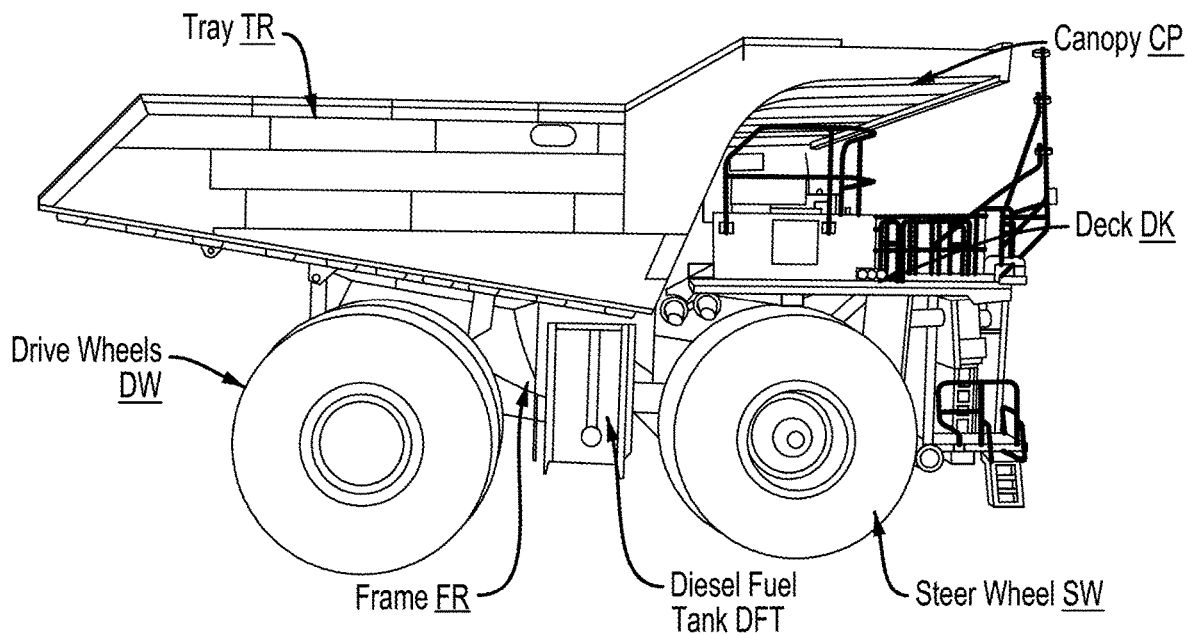
FIGS. 6A-6F are various views of a currently available Komatsu model 930E diesel-powered haul truck.
Figure 6B:
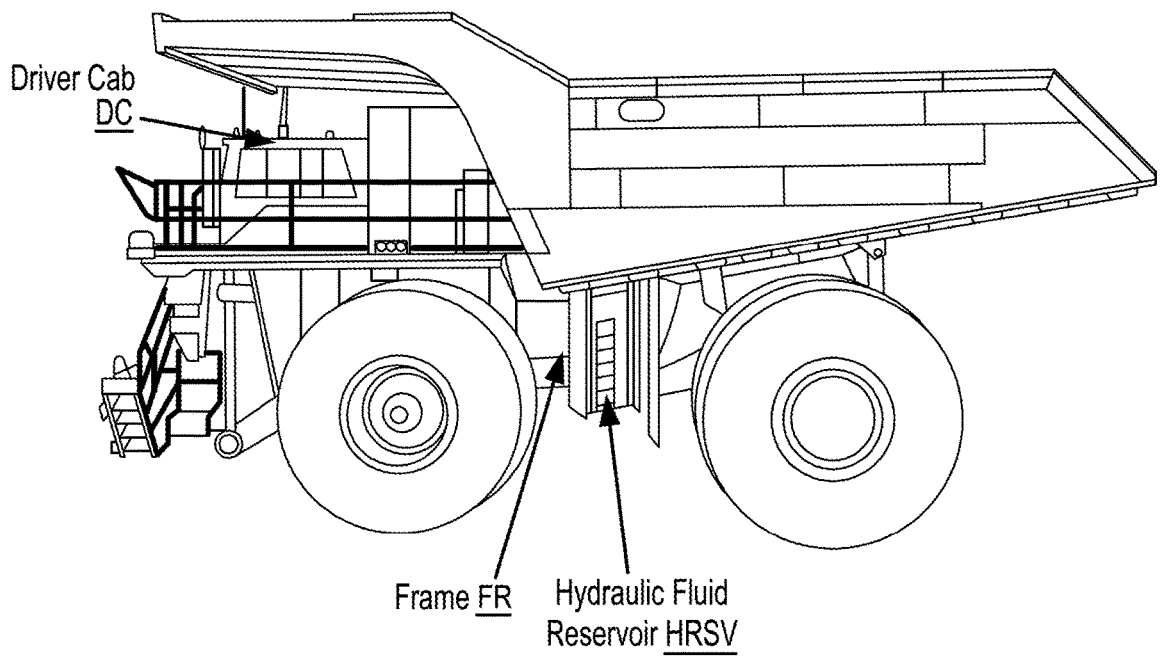
Figure 6C:
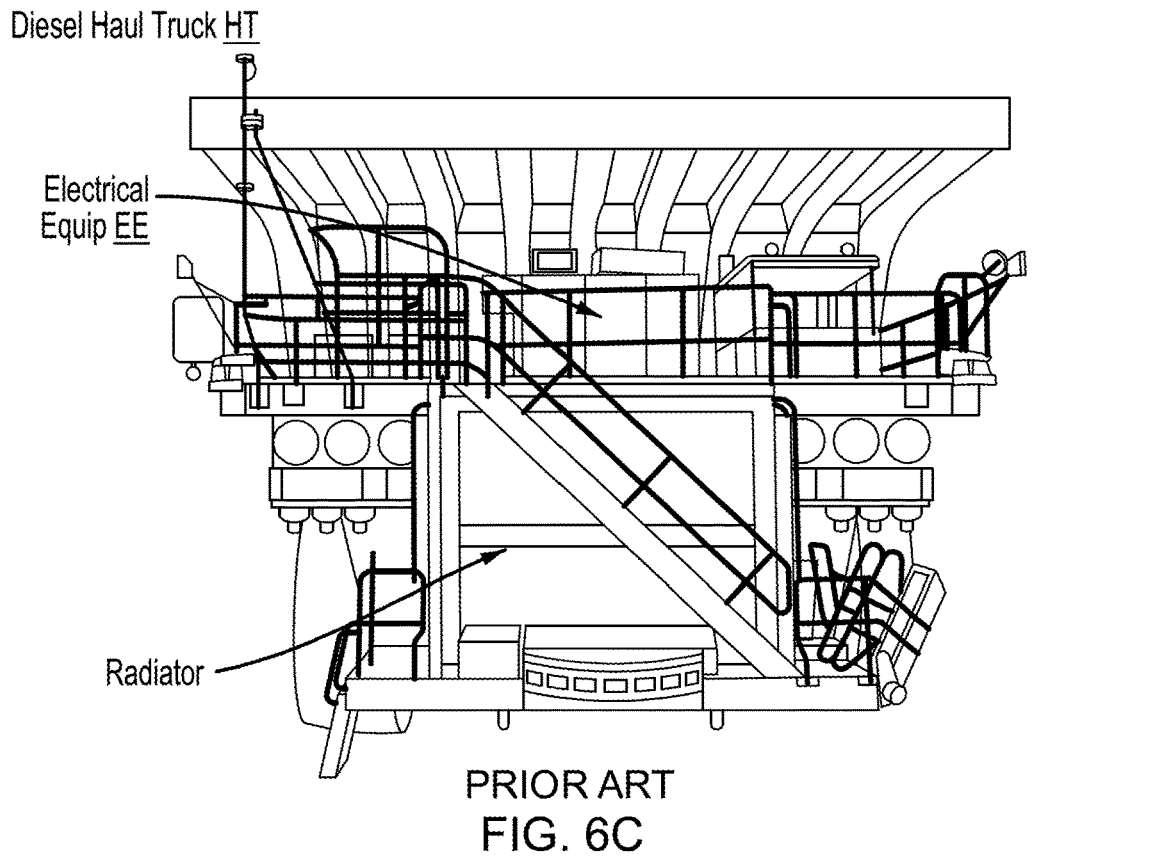
Figure 6D:
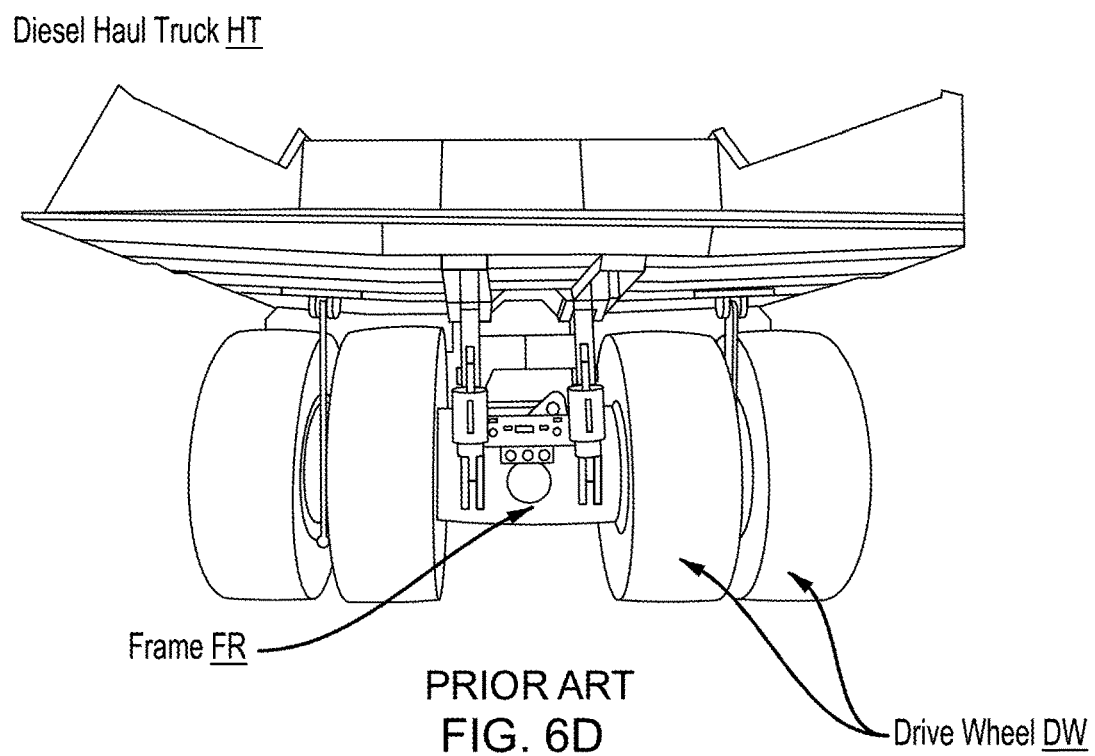
Figure 6E:
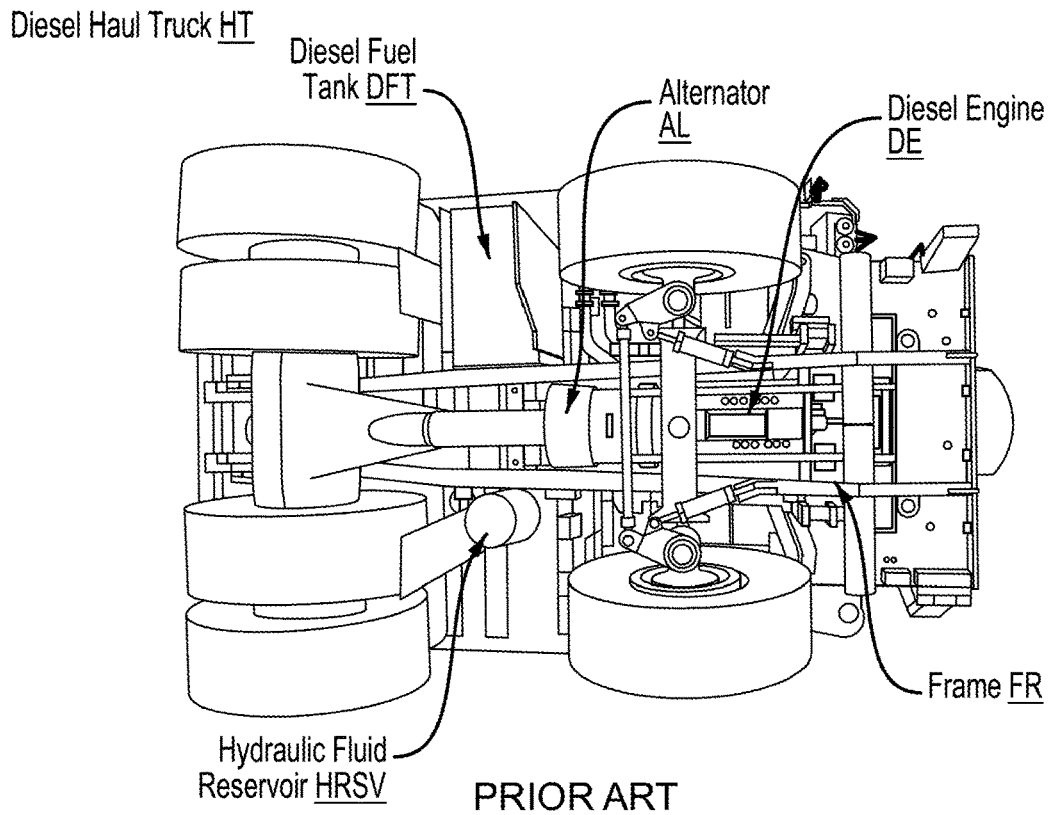
Figure 6F:
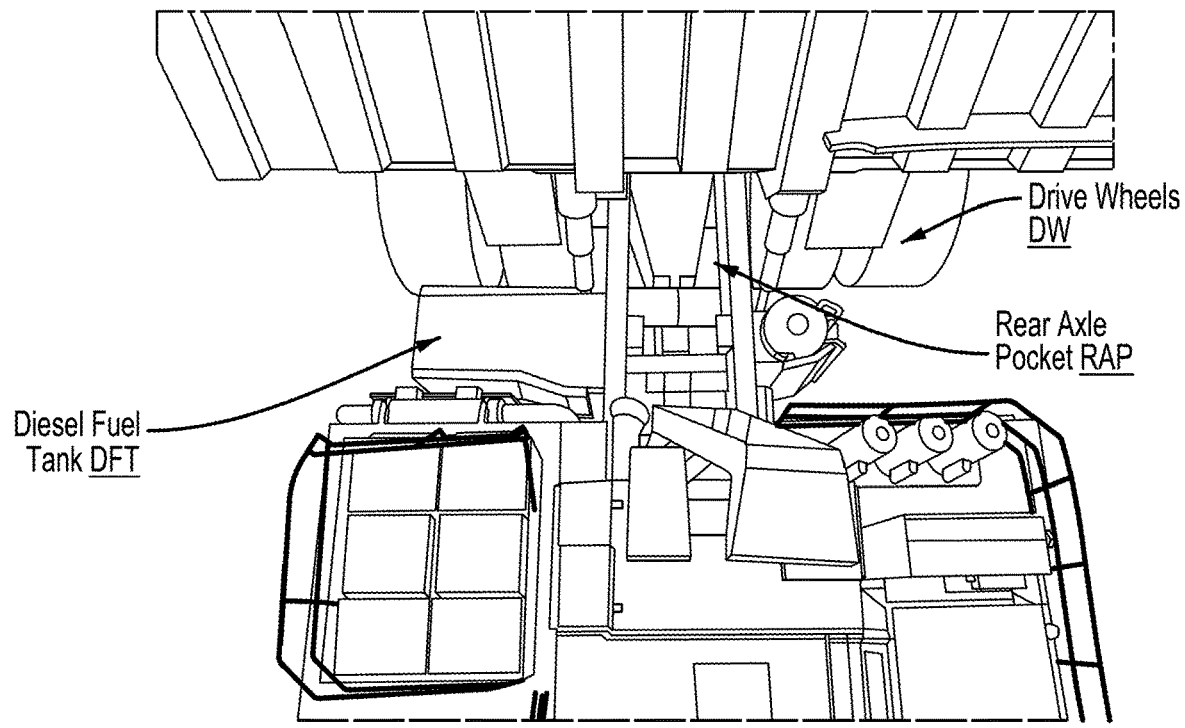
Figure 7A:
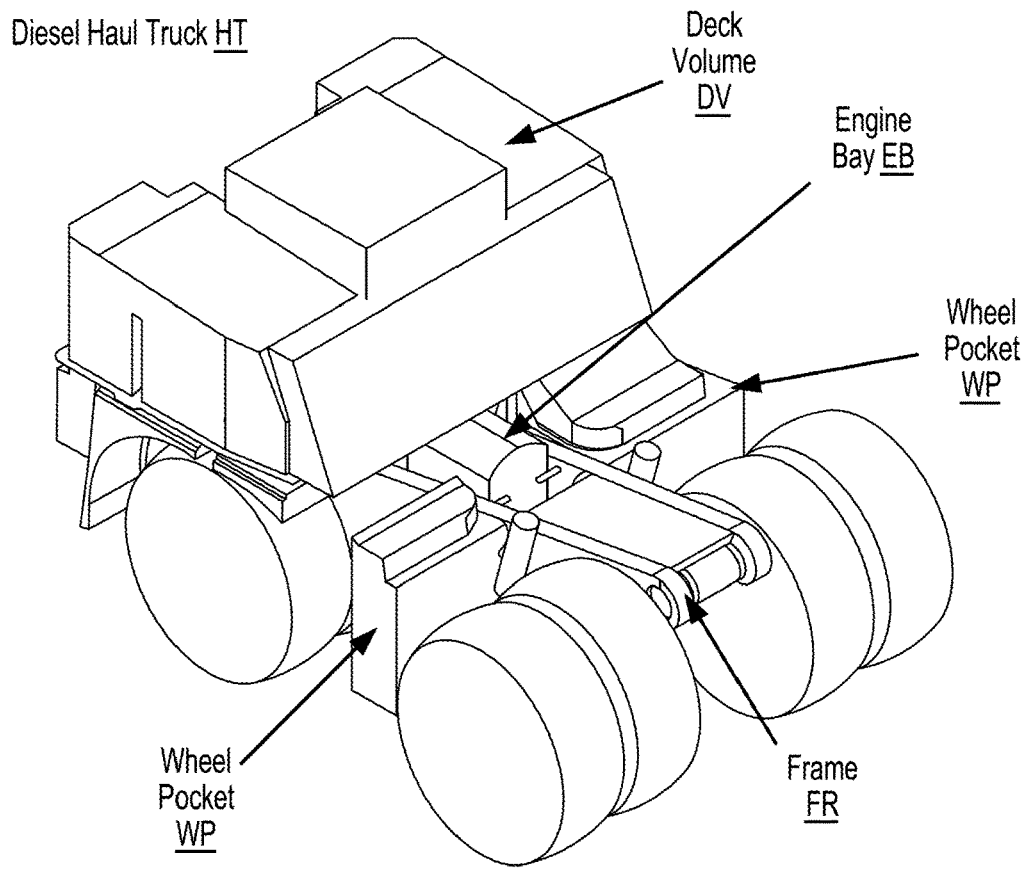
FIGS. 7A and 7B are partial perspective views.
Figure 7B:
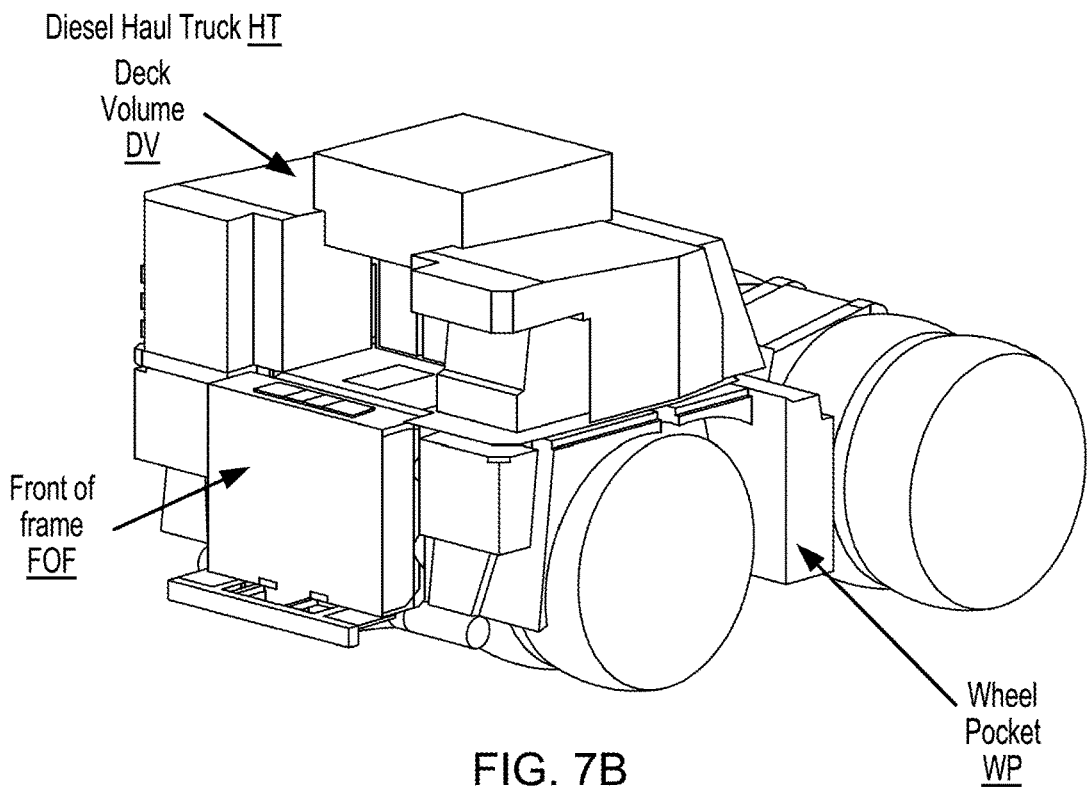
Figure 7C:
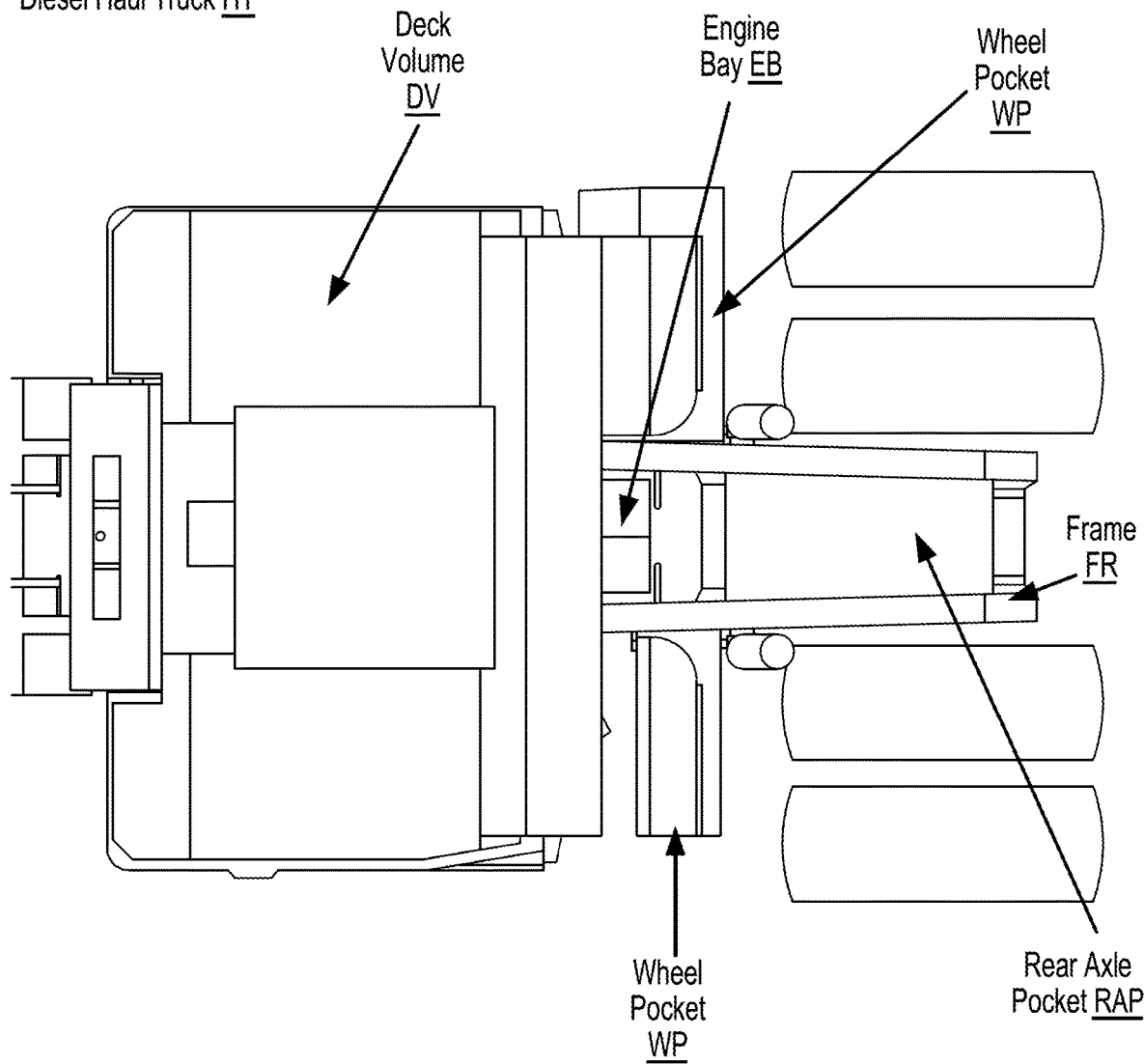
FIG. 7C is a top view.
Figure 7D:
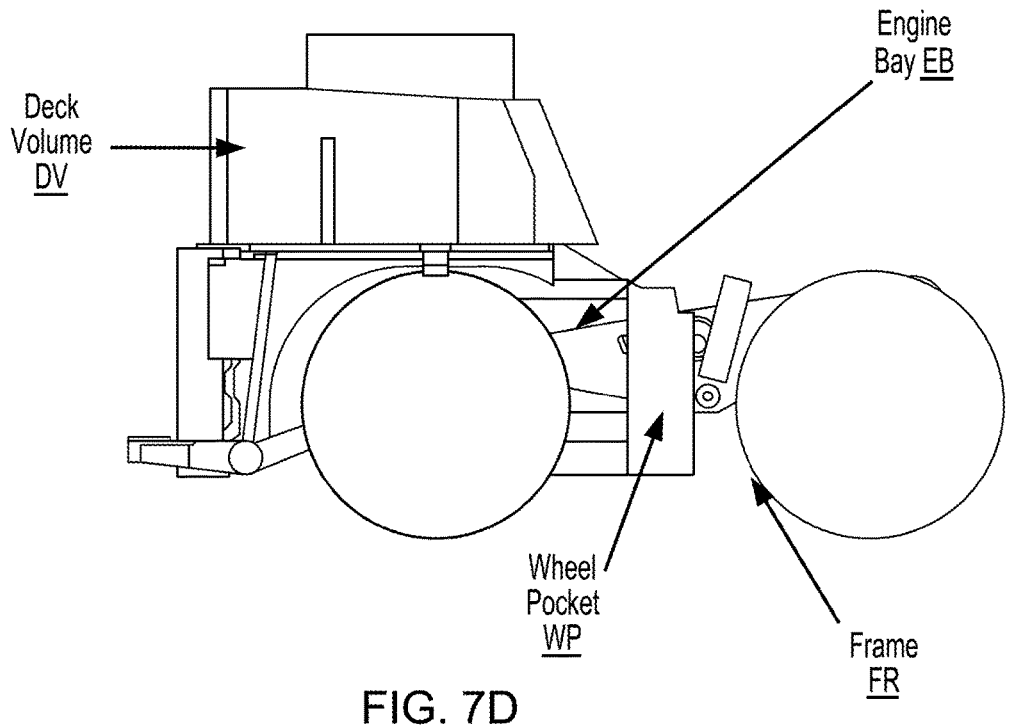
FIGS. 7D and 7E are side views, without and with the tray and canopy, respectively, of the haul truck of FIGS. 6A-6F, showing the available volumes.
Figure 7E:
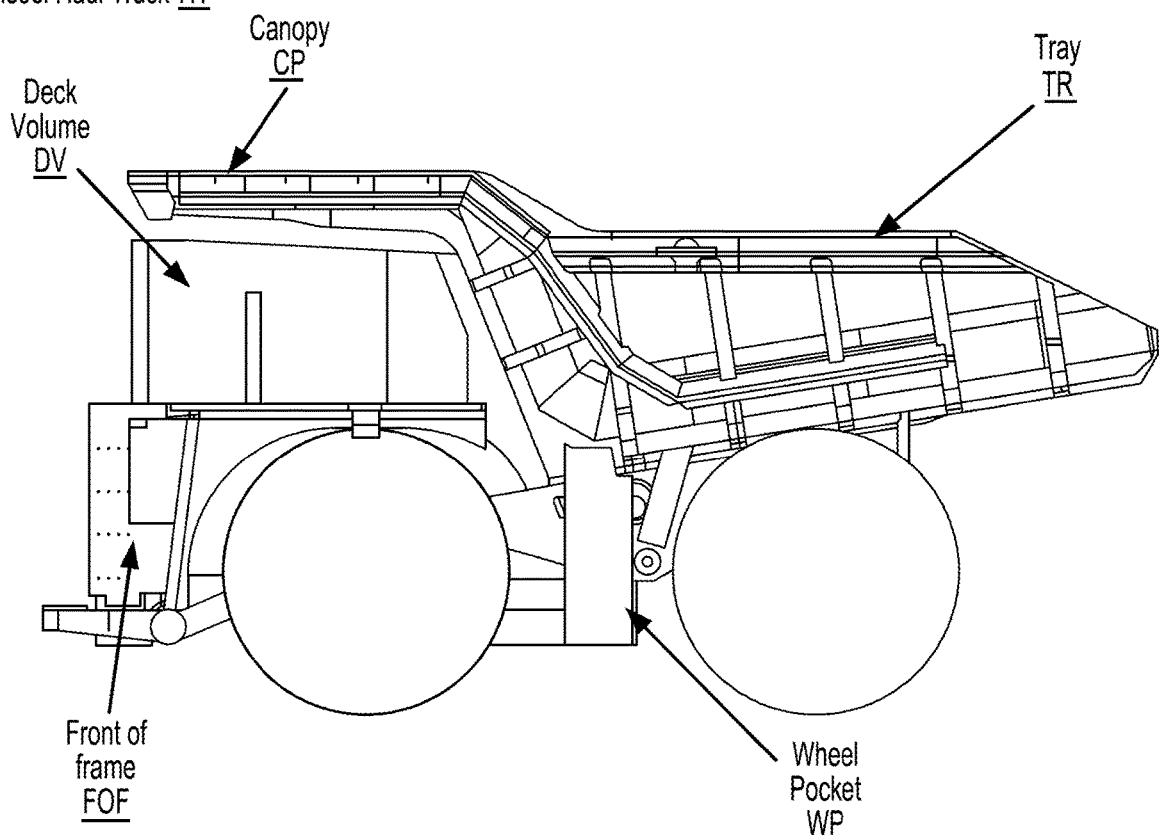

As noted above, one diesel powered haul truck that is suitable to be retrofitted with a hybrid powerplant is a Komatsu model 930E. FIGS. 6A-6D are right side, left side, front, and rear elevation views, respectively, FIG. 6E is a bottom view, and 6F is a partial top view, of a diesel haul truck HT of this model, with its components labeled consistently with FIGS. 1A and 1B above. FIGS. 7A-7E illustrate the available volumes of the model of haul truck shown in FIGS. 6A-6F. FIGS. 7A and 7B are partial perspective views, FIG. 7C is a top view, and FIGS. 7D and 7E are side views, without and with the tray and canopy, respectively. The size of each volume is shown in Table 6, below.

TABLE 6

| Available Volumes | Size of Volume (m³) |
|---|---|
| Deck volume DV | 32 |
| Front of tray FT | n/a |
| Front of frame FOF | 11 |
| Wheel pockets WP | Right side ~9, left side ~6 |
| Engine bay EB | 22 |
| Rear axle pocket RAP | 3 |

Figure 8:
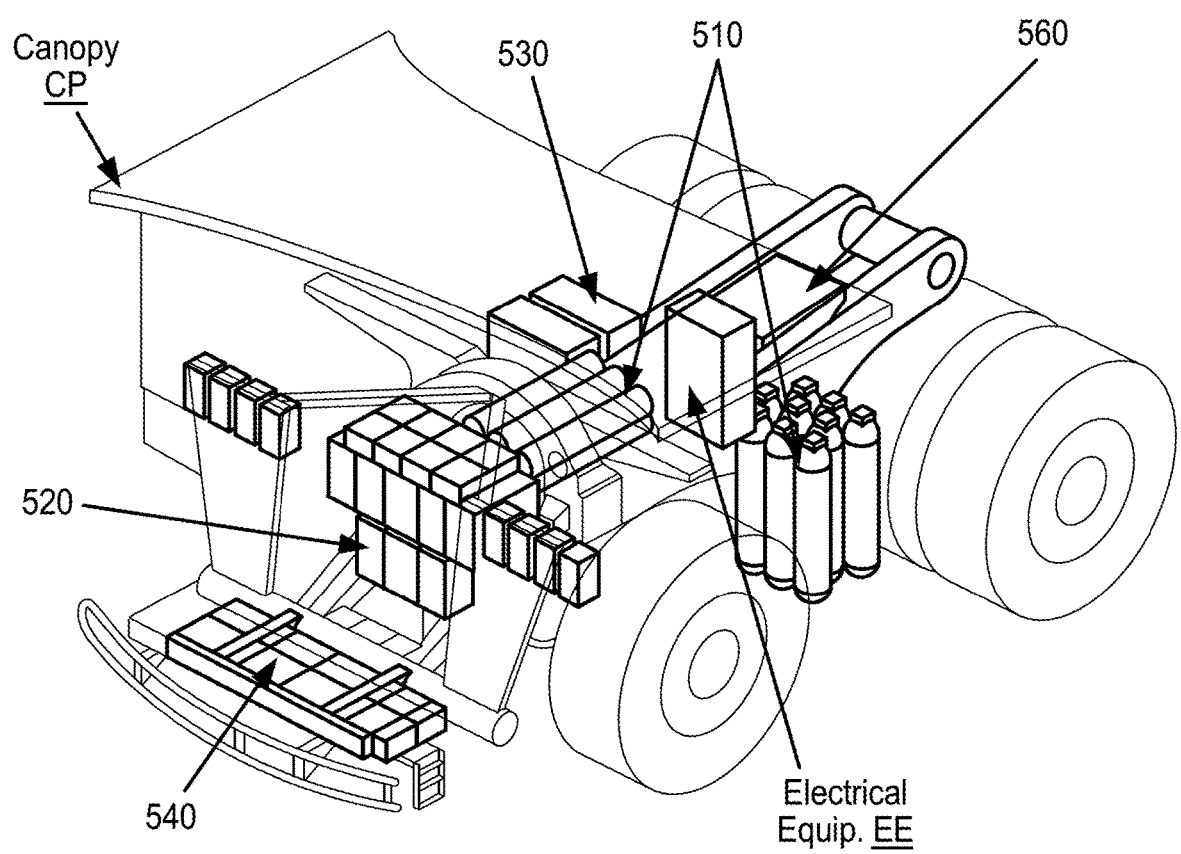
FIG. 8 is an illustration of a hybrid haul truck, according to an embodiment.

FIG. 8 is a front perspective view of a hybrid haul truck 500, according to an embodiment. Hybrid haul truck 500 is a retrofitted version of the Komatsu 930E diesel-powered haul truck shown in FIGS. 6A-6F, with the available volumes shown in FIGS. 7A-7E and Table 6. In this embodiment, tray TR has not been modified, so no front of tray volume FT has been created, but canopy CP has been modified slightly to increase deck volume DV by extending it vertically.

Hybrid haul truck 500 has a CHSS 510 that is split between two volumes—engine bay EB and left wheel pocket WP. In this embodiment, CHSS 510 includes 22 cylindrical high pressure hydrogen storage tanks, each with a diameter of approximately 0.3 m and a length of approximately 2.0 m, with a capacity of approximately 10.0 kg of hydrogen each. Collectively, the 22 tanks can therefore hold approximately 220 kg of hydrogen. CHSS 510 has 13 of the tanks disposed in the engine bay EB, and nine of the tanks disposed in the left wheel pocket WP. Fuel cell system 520 is disposed in the front portion of engine bay EB, and has a volume of about 5.1 m³, capable of producing around 800 kW output power. Battery system 530 is disposed in the right wheel pocket WP, and has a volume of about 2.1 m³. Cooling system 540 is disposed in the front of frame FOF, and has a volume of about 1.8 m³. Hydraulic fluid reservoir 560 is disposed in the rear axle pocket RAP, and has a volume of about 1.1 m³. This arrangement of the hybrid haul truck 500 is also reflected in Table 7 below.

TABLE 7

| Volume/Component | CHSS 510 | Fuel cell system 520 | Battery system 530 | Cooling system 540 | Other 550 | HRSV 560 |
|---|---|---|---|---|---|---|
| Deck volume DV | | | | | Y | |
| Front of tray FT | | | | | | |
| Front of frame FOF | | | | Y | | |
| Left wheel pocket WP | Y | | Y | | | |
| Right wheel pocket WP | | | | | | |
| Engine bay EB | Y | Y | | | Y | |
| Rear axle pocket RAP | | | | | | Y |

Figure 9A:
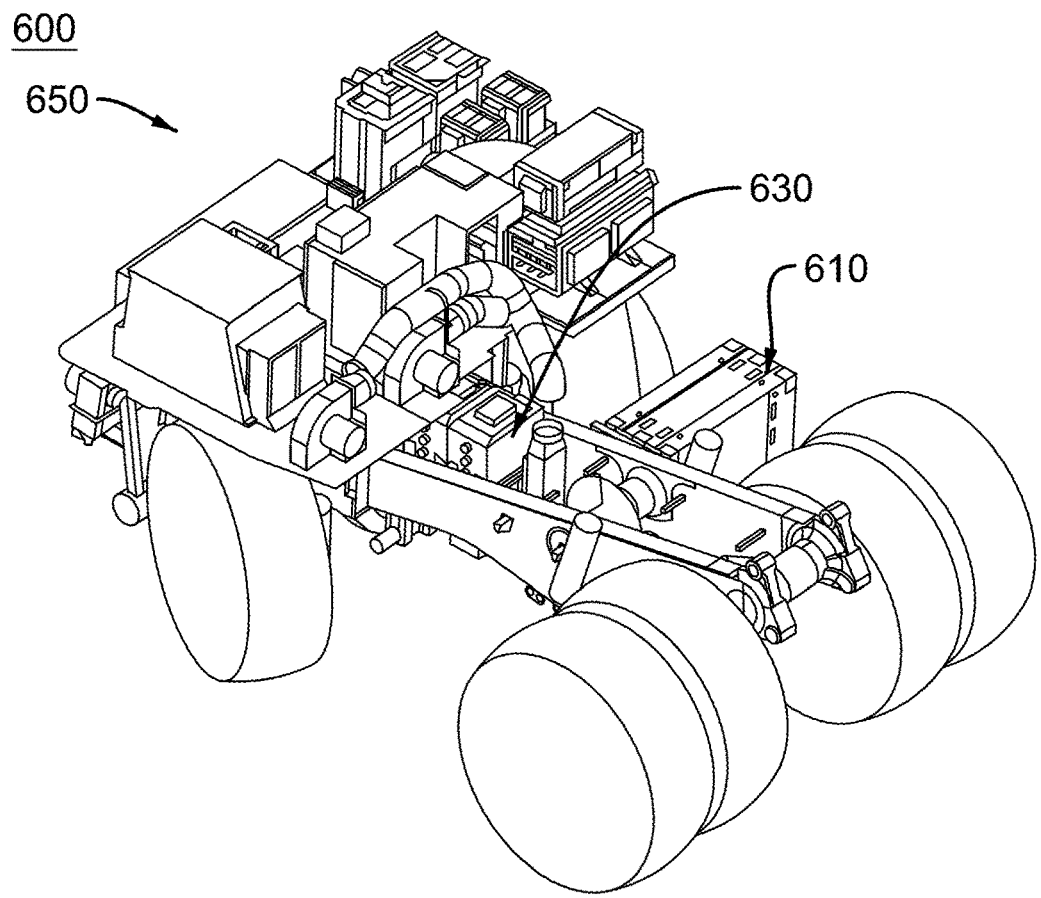
FIGS. 9A and 9B are partial perspective views.
Figure 9B:
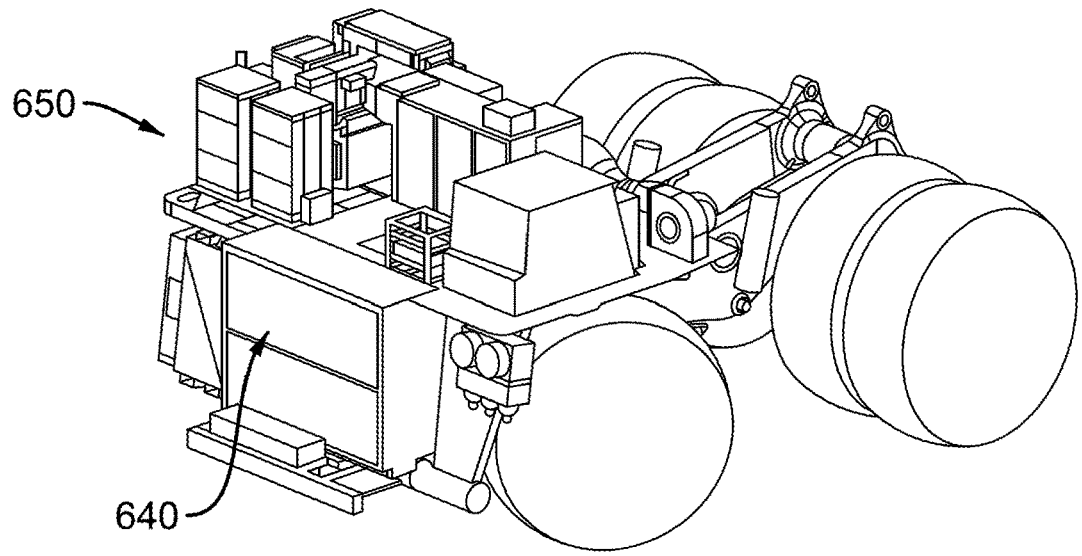
Figure 9C:
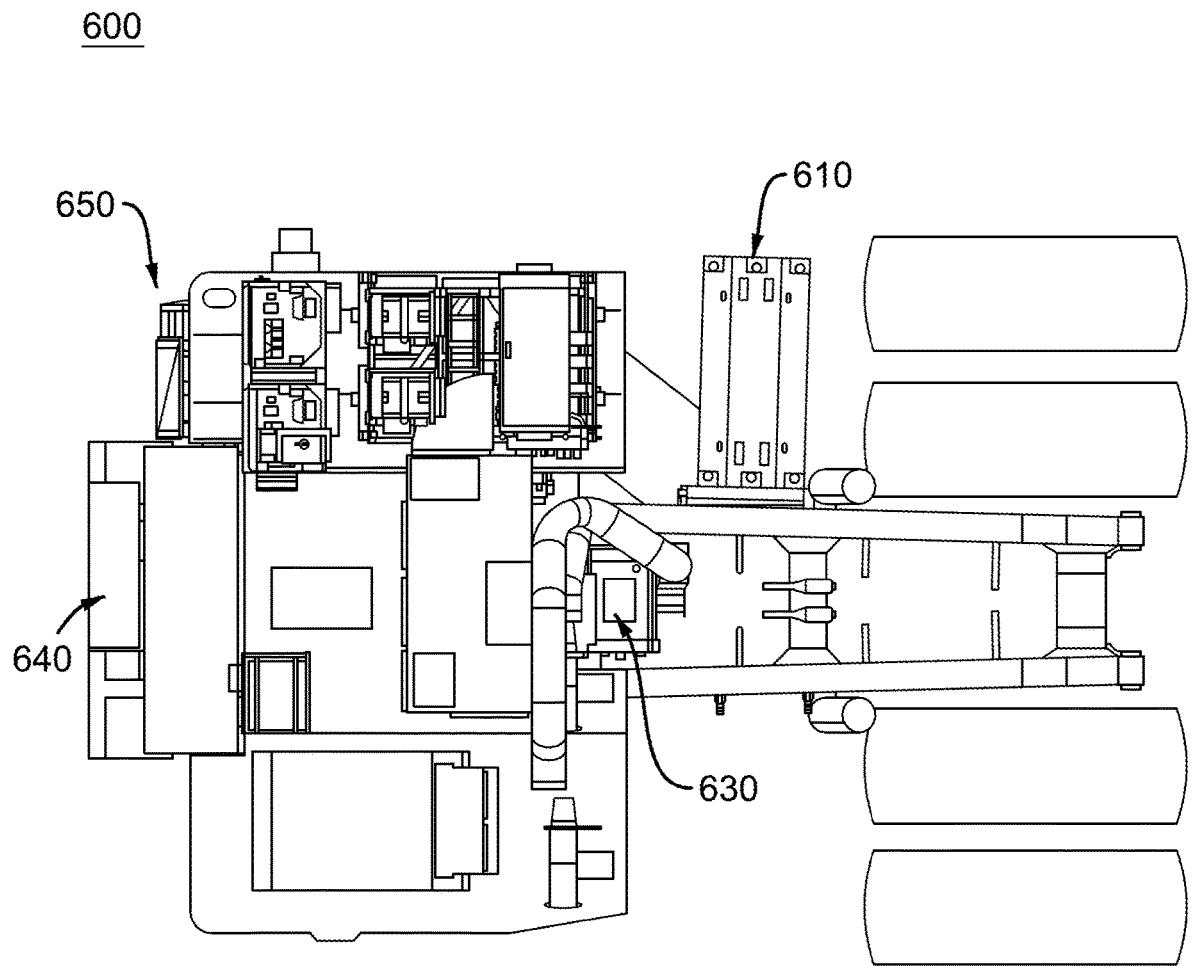
FIG. 9C is a top view.
Figure 9D:
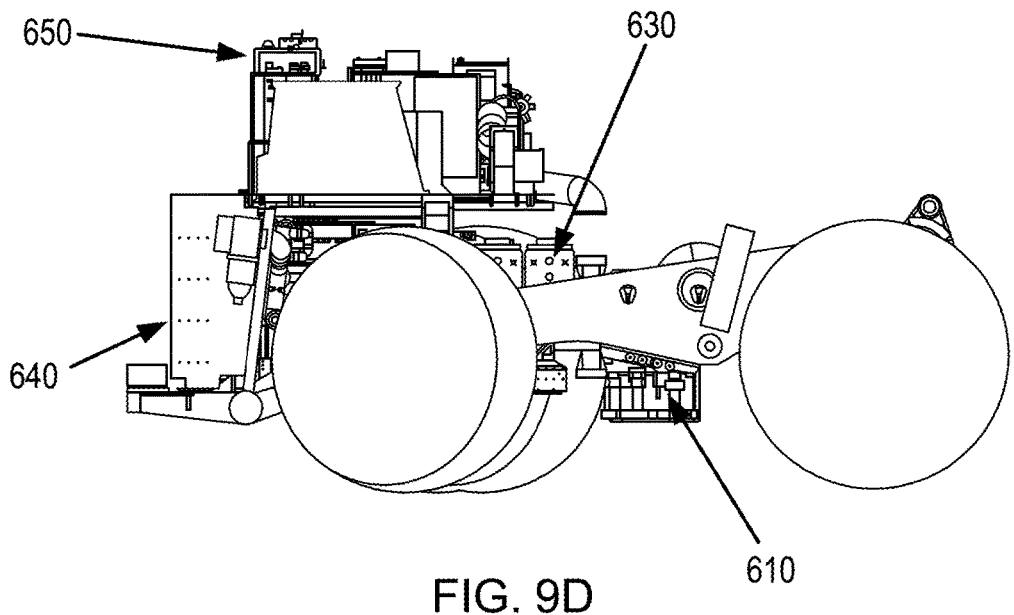
FIGS. 9D and 9E are side views, without and with the tray and canopy, respectively, of a hybrid haul truck, according to an embodiment.
Figure 9E:
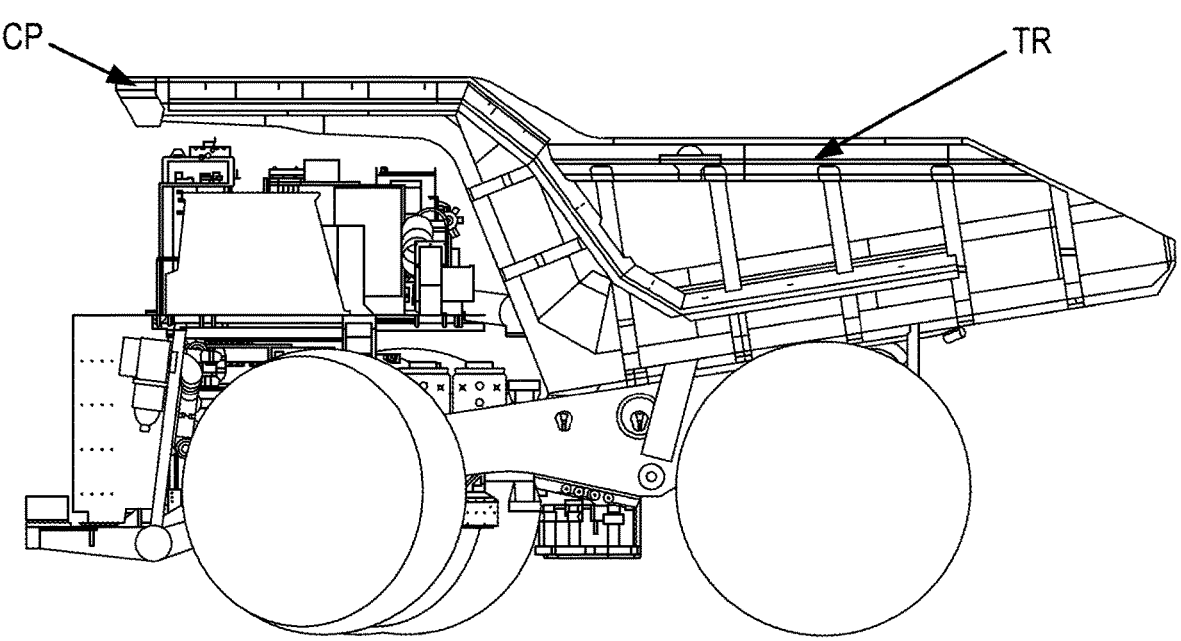

FIGS. 9A and 9B are partial perspective views, FIG. 9C is a top view, and FIGS. 9D and 9E are side views, without and with the tray and canopy, respectively, of a hybrid haul truck, according to an embodiment. As with hybrid haul truck 500 described above, hybrid haul truck 600 is a retrofitted version of the Komatsu 930E diesel-powered haul truck shown in FIGS. 6A-6F, with the available volumes shown in FIGS. 7A-7E and Table 6. In this embodiment, neither the tray TR nor the canopy CP have been modified, so no front of tray volume FT has been created and the deck volume DV has not been increased.

Hybrid haul truck 600 has a CHSS 610 that is disposed in the right wheel pocket WP. In this embodiment, CHSS 610 includes eight cylindrical high pressure hydrogen storage tanks, each with a diameter of approximately 0.3 m and a length of approximately 2.0 m, with a capacity of approximately 8.0 kg of hydrogen each at 350 bar. Collectively, the eight tanks can therefore hold approximately 62.0 kg of hydrogen. Fuel cell system 620 is disposed in the front portion of engine bay EB and has a volume of about 5.0 m³, capable of producing around 800 kW output power. Battery system 630 is disposed in the rear portion of engine bay EB and occupies a volume of approximately 8.9 m³. Contained within this structure is a Li-ion battery with energy storage capacity of about 1,050 kWh, packaging, battery control electronics, packaging, frame, and structure. Cooling system 640 is disposed in the front of frame FOF. Hydraulic fluid reservoir 660 is unchanged from the original haul truck and therefore, is disposed in the left wheel pocket WP (not shown in FIGS. 9A-9E). This arrangement of the hybrid haul truck 600 is also reflected in Table 8 below.

TABLE 8

| Volume/Component | CHSS 610 | Fuel cell system 620 | Battery system 630 | Cooling system 640 | Other 650 | HRSV 660 |
|---|---|---|---|---|---|---|
| Deck volume DV | | | | | Y | |
| Front of tray FT | | | | | | |
| Front of frame FOF | | | | Y | | |
| Left wheel pocket WP | | | | | | Y |
| Right wheel pocket WP | Y | | | | | |
| Engine bay EB | | Y | Y | | Y | |
| Rear axle pocket RAP | | | | | | |

Figure 10:
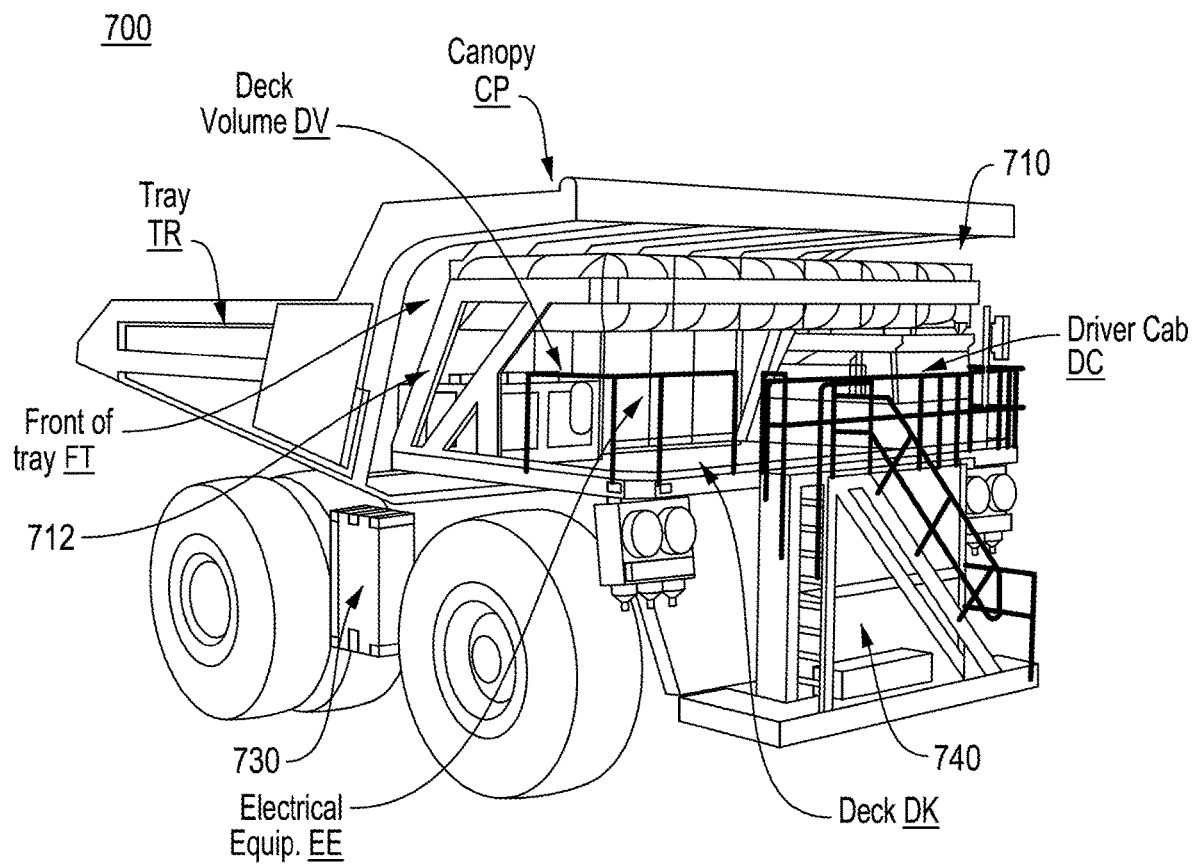
FIG. 10 is an illustration of a hybrid haul truck, according to an embodiment.

FIG. 10 is a front perspective view of a hybrid haul truck 700, according to an embodiment. Hybrid haul truck 700 is a retrofitted version of the Komatsu 930E diesel-powered haul truck shown in FIGS. 6A-6F. In this embodiment, tray TR and canopy CP have been modified to create a front of tray volume FT in front of tray TR, and to increase deck volume DV by extending it vertically. The size of each volume is shown in Table 9, below.

TABLE 9

| Available Volumes | Size of Volume (m³) |
|---|---|
| Deck volume DV | 62 |
| Front of tray FT | 15 |
| Front of frame FOF | 11 |
| Wheel pockets WP (each) | Right side -9, left side 6 |
| Engine bay EB | 22 |
| Rear axle pocket RAP | 3 |

Hybrid haul truck 700 has a CHSS 710 that is disposed in the deck volume DV and front of tray volume FT. In this embodiment, CHSS 710 includes 22 cylindrical high pressure hydrogen storage tanks, each with a diameter of 0.66 m and a length of 3.6 m, with a volume of approximately 1.0 m³. The tanks are configured to store gaseous hydrogen at approximately 700 bar, and thus each can hold approximately 31.0 kg of hydrogen. Collectively, the 22 tanks can therefore hold approximately 670 kg of hydrogen. The tanks are supported on a frame 712 that extends upwardly from the deck DK and between the top of driver cab DC and electrical equipment EE and the bottom of canopy CP. The tanks are disposed in two horizontally extending rows of 11 tanks, stacked vertically above one another. Battery system 730 is disposed in the right wheel pocket WP, with a capacity of 600 kWh and a volume of 9.0 m³. Fuel cell system 720 is disposed in the engine bay EB, with a capacity of 1,400 kW and a volume of 15.0 m³. Cooling system 740 is disposed in the front of frame FOF. Hydraulic fluid reservoir 760 is unchanged from the original haul truck and thus, is disposed in the left wheel pocket WP. This arrangement of the hybrid haul truck 700 is also reflected in Table 10 below.

TABLE 10

| Volume/Component | CHSS 710 | Fuel cell system 720 | Battery system 730 | Cooling system 740 | Other 750 | HRSV 760 |
|---|---|---|---|---|---|---|
| Deck volume DV | Y | | | | Y | |
| Front of tray FT | Y | | | | | |
| Front of frame FOF | | | | Y | | |
| Left wheel pocket WP | | | | | | Y |
| Right wheel pocket WP | | | Y | | | |
| Engine bay EB | | Y | | | Y | |
| Rear axle pocket RAP | | | | | | |

Figure 11A:
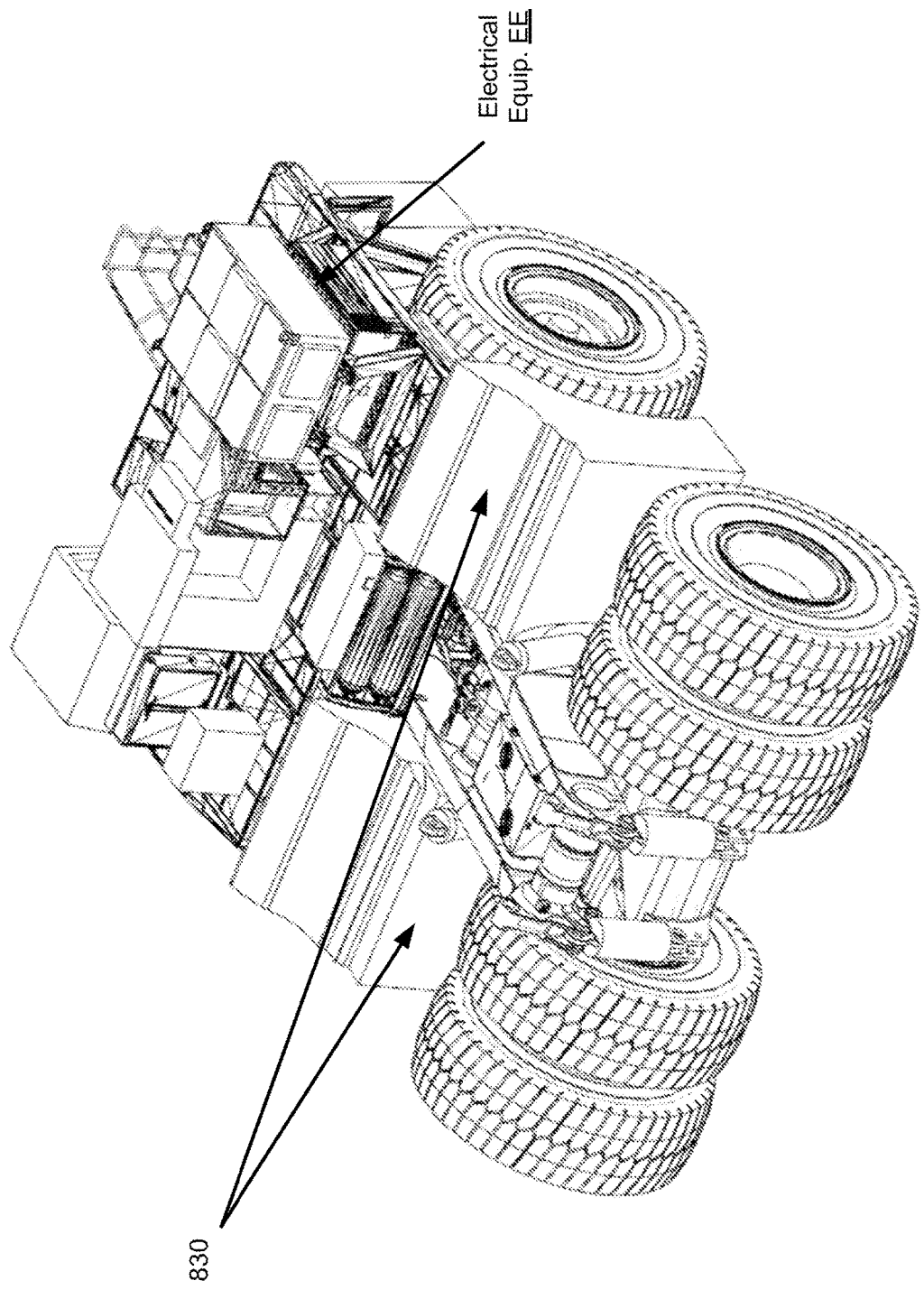
FIGS. 11A and 11B are a rear perspective illustration and a front perspective illustration, respectively, of a hybrid haul truck with the tray omitted.
Figure 11B:
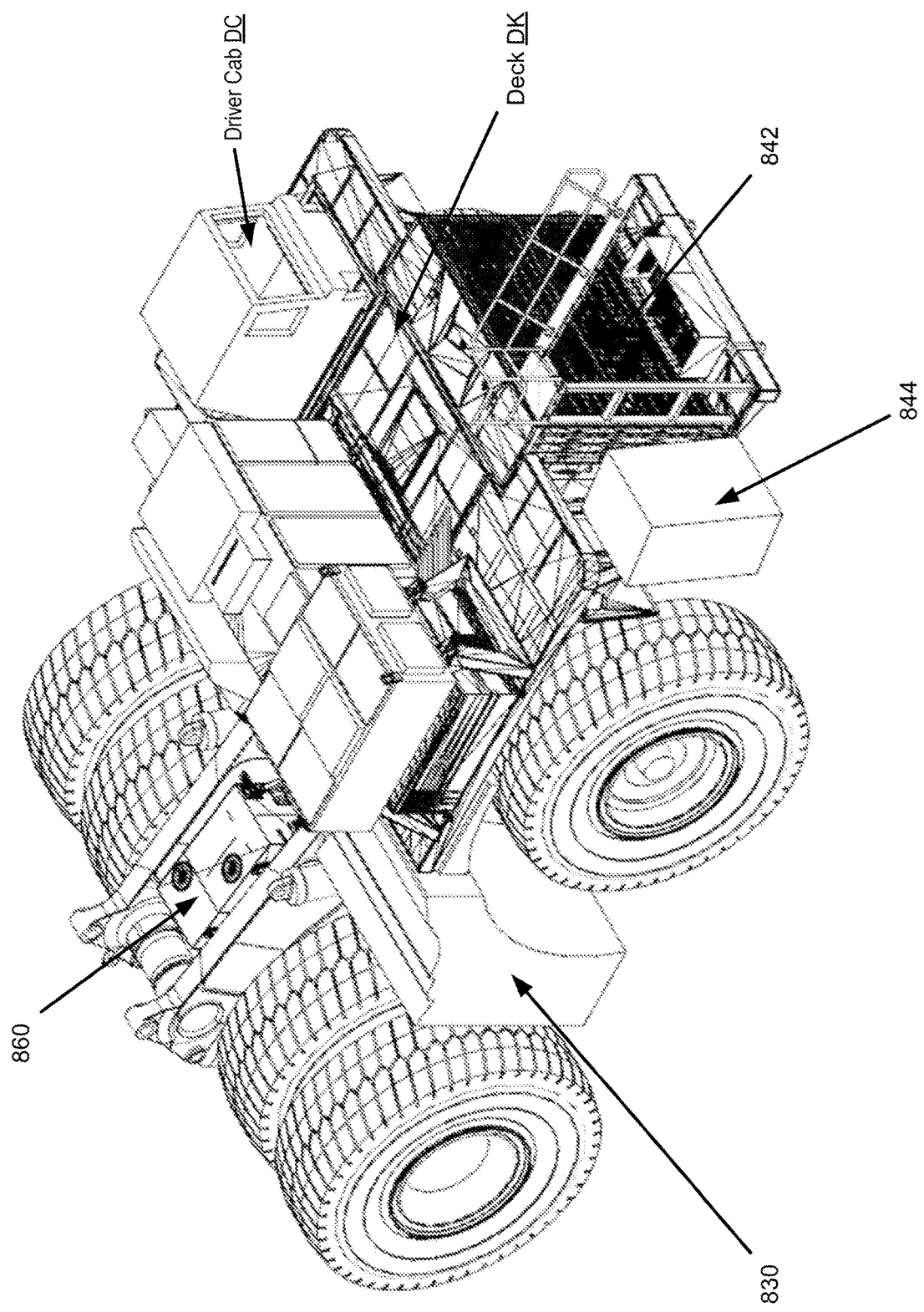
Figure 11C:
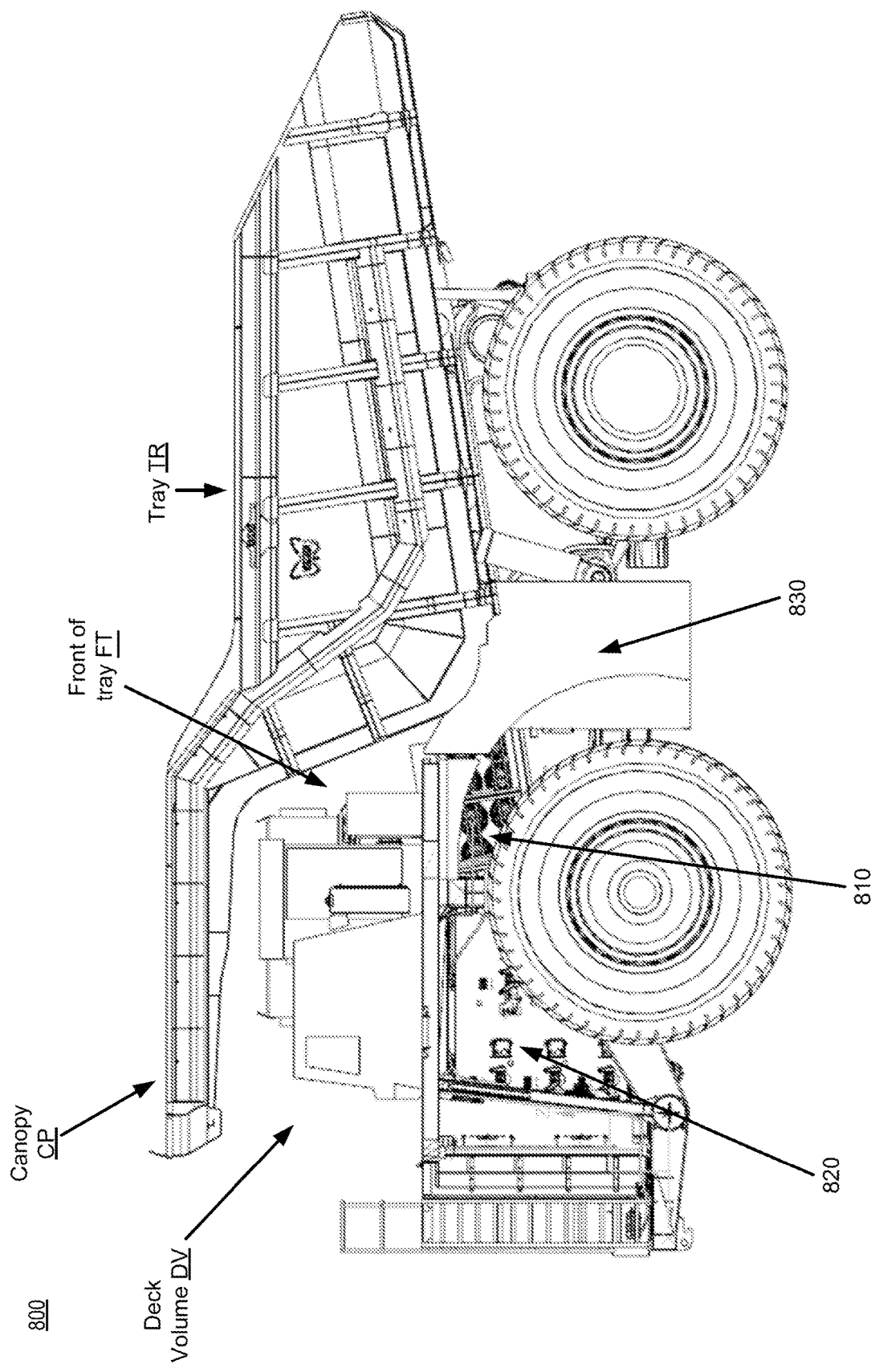
FIG. 11C is a side view illustration of the haul truck including the tray, according to an embodiment.

FIGS. 11A and 11B are partial perspective views, and FIG. 11C is a side view of a hybrid haul truck 800, according to an embodiment. Hybrid haul truck 800 is a retrofitted version of the Komatsu 930E diesel-powered haul truck shown in FIGS. 6A-6F. In this embodiment, the hydraulics manifold has been relocated to create equivalent wheel pocket WP volumes on the left and right sides. The size of each volume is shown in Table 11, below.

TABLE 11

| Available Volumes | Size of Volume (m³) |
|---|---|
| Deck volume DV | 31 |
| Front of tray FT | 13 |
| Front of frame FOF | 9 |
| Wheel pockets WP (each) | 11 |
| Engine bay EB | 23 |
| Rear axle pocket RAP | 3 |

Hybrid haul truck 800 has a HSS 810 that is disposed in the front of tray FT volume. In this embodiment, HSS 810 is configured to store gaseous hydrogen, and includes eight hydrogen storage tanks, each with a diameter of 0.4 m and a length of 2.0 m, with an internal volume of approximately 200 L. Battery system 830 is disposed in both the right and left wheel pockets WP, with a minimum continuous discharge capability at least 1400 kW, a capacity of 500-1,000 kWh, an approximate volume of 22.0 m$^3$, and an approximate mass of 15.0 tonnes. This arrangement of battery system 830 disposes the substantial mass of batteries symmetrically about the truck's centerline, longitudinally near the truck's existing center of gravity, and relatively low compared to the trucks' center of gravity, all tending to improve the stability of the truck. Fuel cell system 820 is disposed in the engine bay EB, with a capacity of 1,100 kW and a volume of 23.0 m$^3$. Cooling system 840 is disposed in the front of frame FOF, and includes a main radiator 842 to cool the fuel cell system 820 and one or more additional radiators 844 to cool other components of the truck, such as the traction converter and power electronics. Hydraulic fluid reservoir 860 is moved from the original haul truck location, and is disposed in the rear axle pocket RAP. This arrangement of the hybrid haul truck 800 is also reflected in Table 12 below.

TABLE 12

| Volume/Component | HSS 810 | Fuel cell system 820 | Battery system 830 | Cooling system 840 | Other 850 | HRSV 860 |
|---|---|---|---|---|---|---|
| Deck volume DV | | | | Y | | |
| Front of tray FT | Y | | | | | |
| Front of frame FOF | | | | Y | | |
| Left wheel pocket WP | | | Y | | | |
| Right wheel pocket WP | | | Y | | | |
| Engine bay EB | | Y | | | Y | |
| Rear axle pocket RAP | | | | | | Y |

Figure 12A:
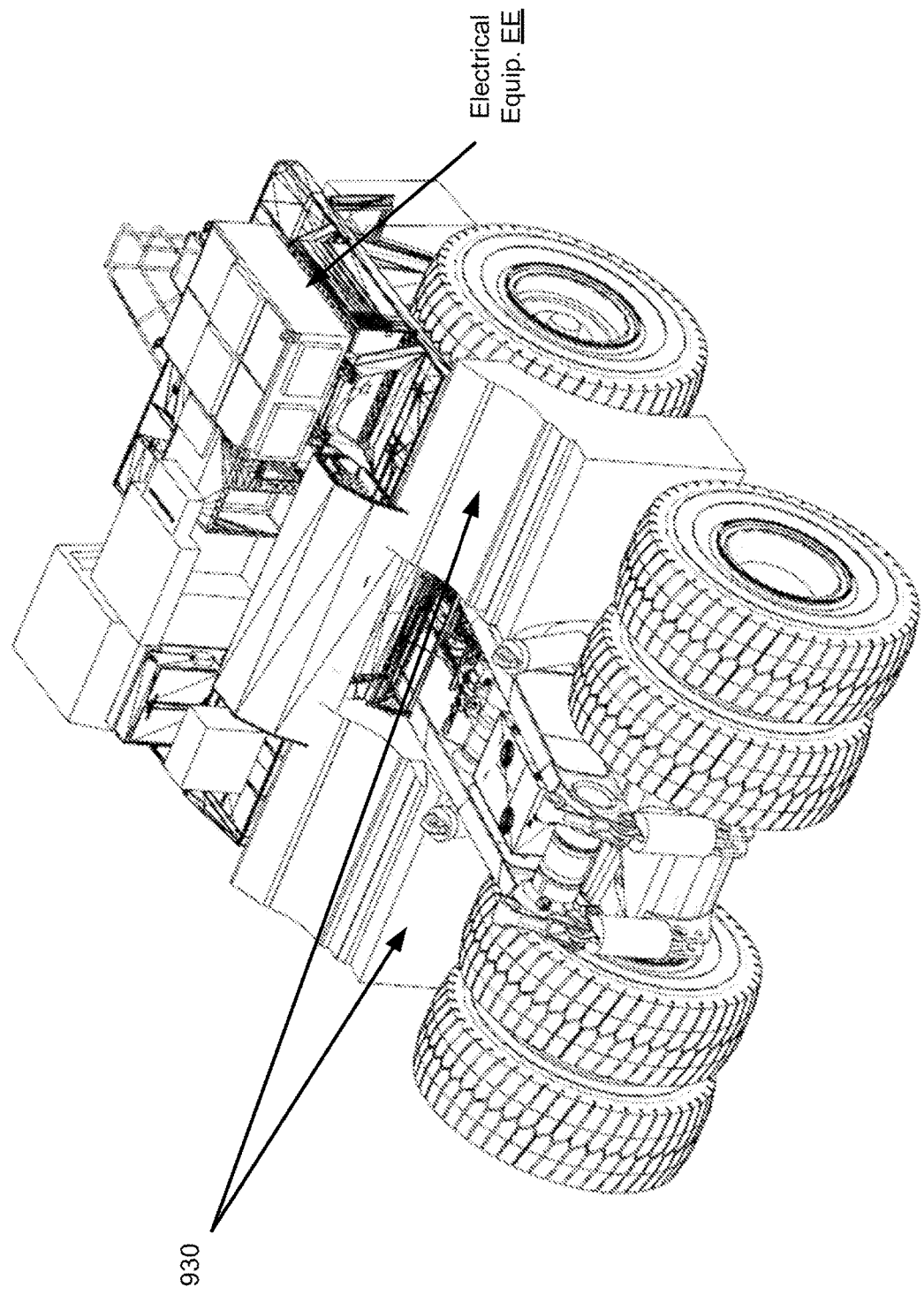
FIGS. 12A and 12B are a rear perspective illustration and a front perspective illustration, respectively, of a hybrid haul truck with the tray omitted.
Figure 12B:
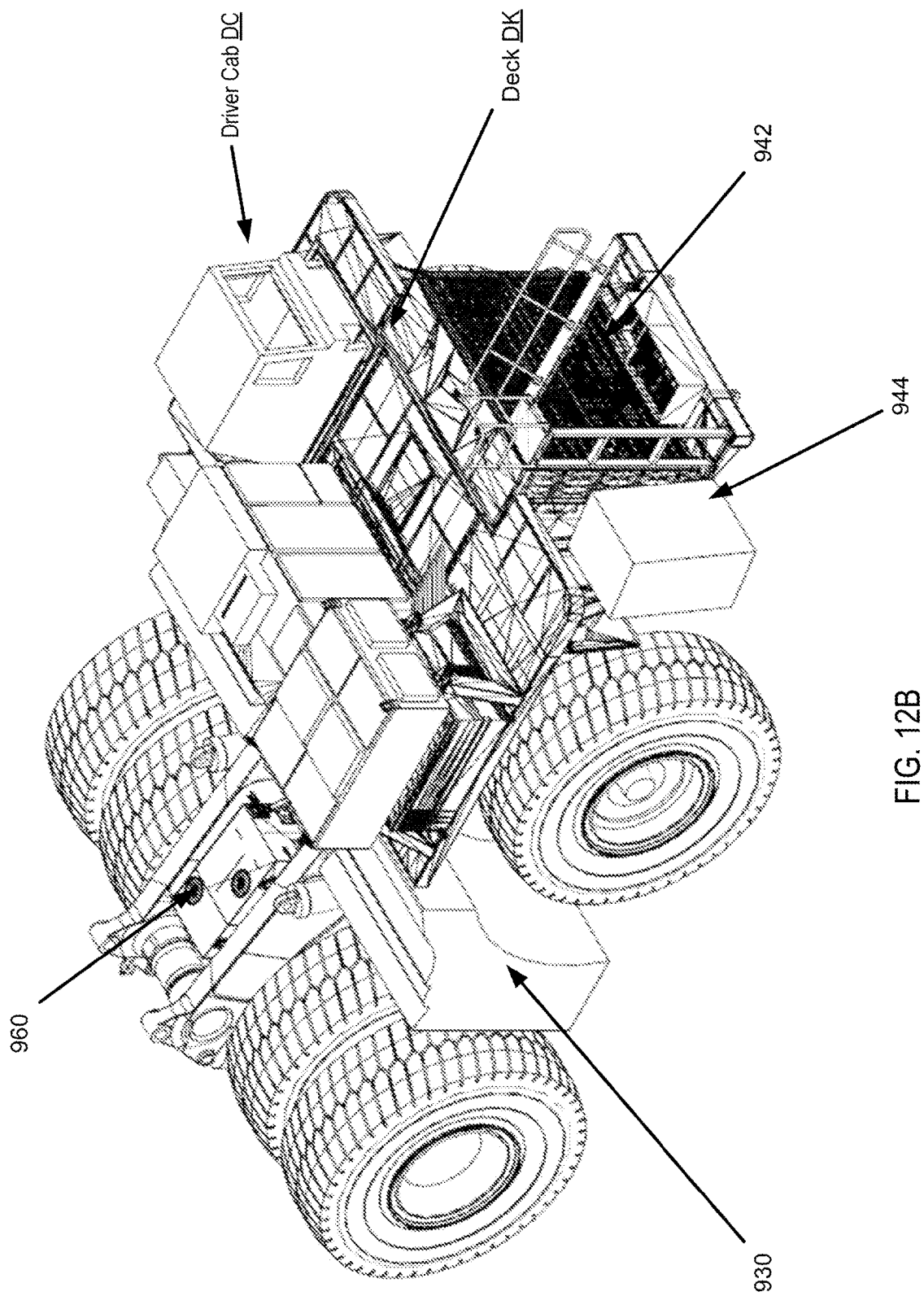
Figure 12C:
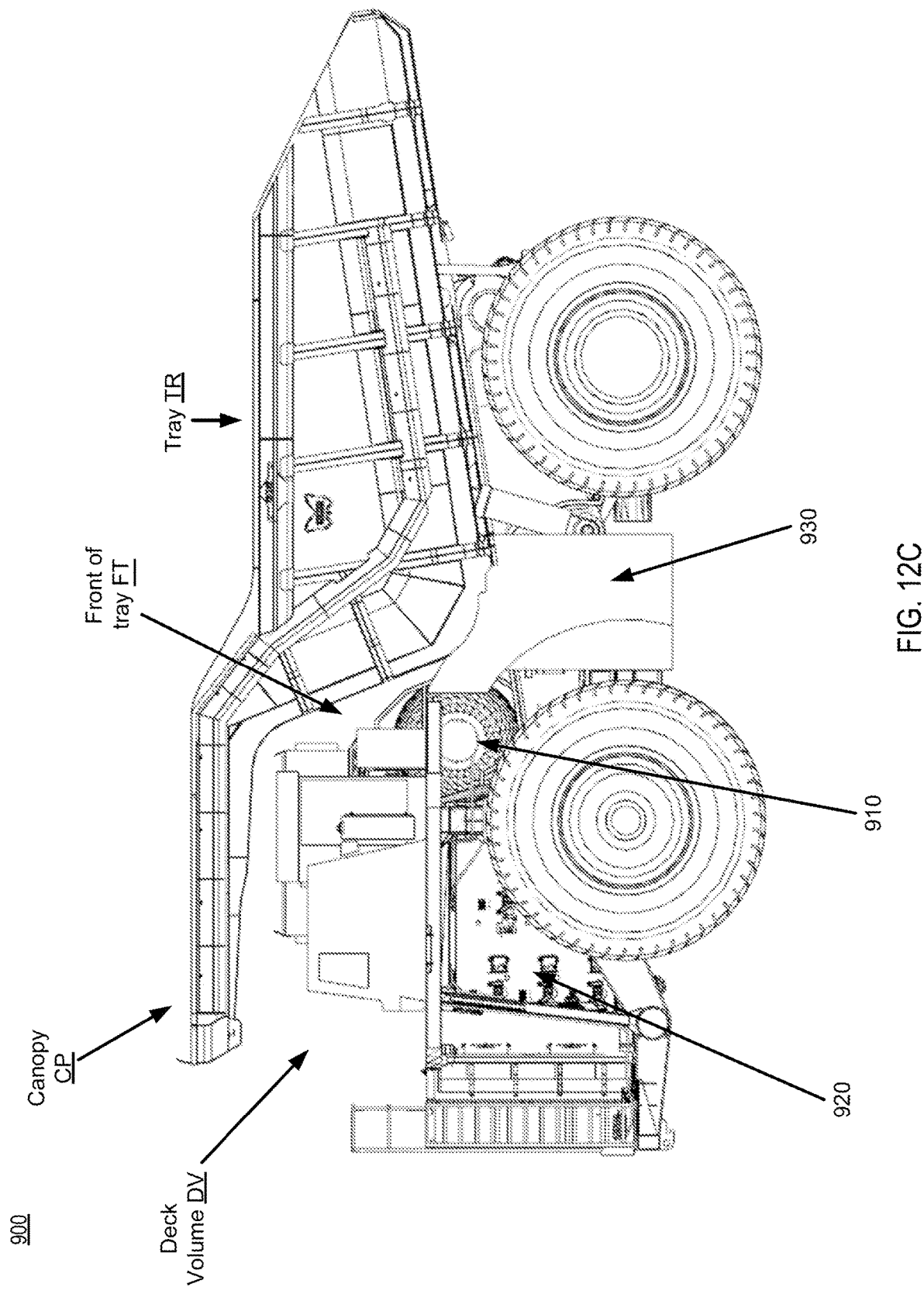
FIG. 12C is a side view illustration of the haul truck including the tray, according to an embodiment.

FIGS. 12A and 12B are partial perspective views, and FIG. 12C is a side view of a hybrid haul truck 900, according to an embodiment. Hybrid haul truck 900 is a retrofitted version of the Komatsu 930E diesel-powered haul truck shown in FIGS. 6A-6F. In this embodiment, the drive cabinet has been shifted forward, the center deck has been modified and the hydraulic braking and steering accumulators have been relocated to increase the front of tray FT volume. The hydraulics manifold has also been relocated to create equivalent wheel pocket WP volumes on the left and right sides. The size of each volume is shown in Table 13, below.

TABLE 13

| Available Volumes | Size of Volume (m$^3$) |
|---|---|
| Deck volume DV | 31 |
| Front of tray FT | 13 |
| Front of frame FOF | 11 |
| Wheel pockets WP (each) | 11 |
| Engine bay EB | 23 |
| Rear axle pocket RAP | 3 |

Hybrid haul truck 900 has a HSS 910 that is disposed in the front of tray FT volume. In this embodiment, HSS 910 is configured to store liquid hydrogen, and includes a single insulated hydrogen storage tank, with a diameter of 1.6 m and a length of 2.9 m, with an internal volume of approximately 4.7 m$^3$. In some implementations, the tank is configured to store liquid hydrogen at approximately 23.0 Kelvins. In some implementations, the tank can hold up to, for example, 300 kg of hydrogen, dependent at least in part upon system pressure. In some implementations, the front of tray FT volume can be extended by shifting the drive cabinet forward, modifying the center deck, and relocating the hydraulic steering and braking accumulators. These modifications may allow the tank to be bounded by the horse collar in the forward, the tray in the rear and top, the chassis in the bottom, and the wheels on the sides.

Battery system 930 is disposed in both the right and left wheel pockets WP, with a minimum continuous discharge capability of at least 1400 kW, a capacity of 500-1000 kWh, an approximate volume of 22.0 m$^3$, and an approximate mass of 15.0 tonnes. This arrangement of battery system 930 disposes the substantial mass of batteries symmetrically about the truck's centerline, longitudinally near the truck's existing center of gravity, and relatively low compared to the trucks' center of gravity, all tending to improve the stability of the truck. Fuel cell system 920 is disposed in the engine bay EB, with a capacity of 1,100 kW and a volume of 23.0 m$^3$. Cooling system 940 is disposed in the front of frame FOF, and includes a main radiator 942 to cool the fuel cell system 920 and one or more additional radiators 944 to cool other components of the truck, such as the traction converter and power electronics. Hydraulic fluid reservoir 960 is moved from the original haul truck location, and is disposed in the rear axle pocket RAP. This arrangement of the hybrid haul truck 900 is also reflected in Table 14 below.

TABLE 14

| Volume/Component | HSS 910 | Fuel cell system 920 | Battery system 930 | Cooling system 940 | Other 950 | HRSV 960 |
|---|---|---|---|---|---|---|
| Deck volume DV | | | | Y | | |
| Front of tray FT | Y | | | | | |
| Front of frame FOF | | | | Y | | |
| Left wheel pocket WP | | | Y | | | |
| Right wheel pocket WP | | | Y | | | |
| Engine bay EB | | Y | | | Y | |
| Rear axle pocket RAP | | | | | | Y |

Figure 13A:
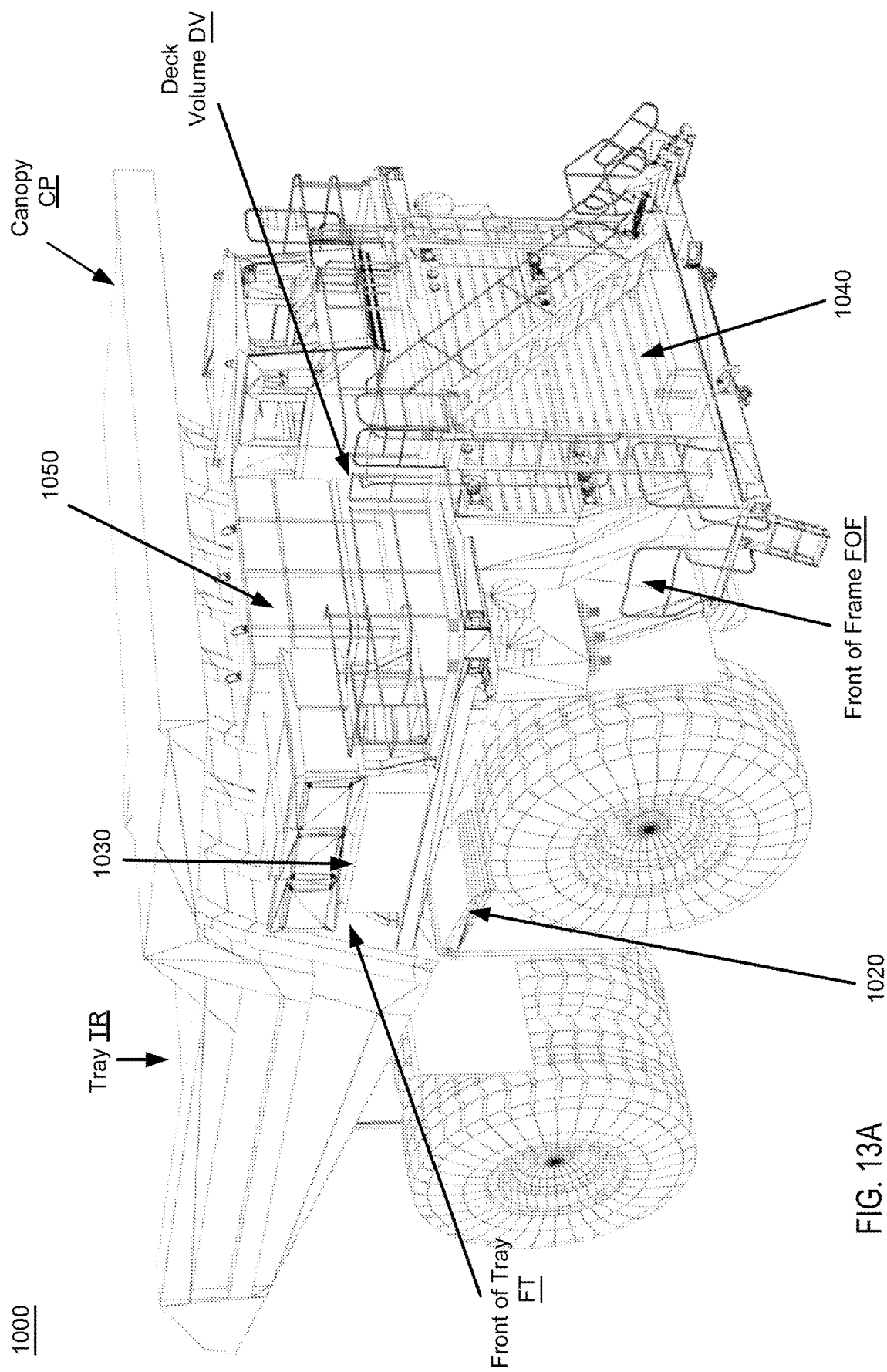
FIG. 13A is a perspective illustration of a hybrid haul truck, according to an embodiment.

FIG. 13A is a perspective view of a hybrid haul truck 1000, according to an embodiment. FIGS. 13B-13E are various partially exploded view illustrating components of the hybrid haul truck 1000. The hybrid haul truck 1000 is a retrofitted version of the Komatsu 930E diesel-powered haul truck shown in FIGS. 6A-6F. In this embodiment, the available deck volume DV and/or font of tray volume FT is/are utilized and/or is/are modified to allow utilization of (or maximize utilization of) these available volumes. For example, in some implementations, the center deck can be modified and/or the hydraulic braking and steering accumulators can be modified and/or relocated to increase the front of tray FT volume. The hydraulics manifold can also be relocated to create wheel pocket WP volumes on the left and right sides. Hydraulic fluid reservoir (not shown) has been moved from the original haul truck location, and is disposed in the rear axle pocket RAP (not shown). The size of each volume is shown in Table 15, below.

TABLE 15

| Available Volumes | Size of Volume (m$^3$) |
|---|---|
| Deck volume DV | 31 |
| Front of tray FT | 13 |

TABLE 15-continued

| Available Volumes | Size of Volume (m³) |
|---|---|
| Front of frame FOF | 11 |
| Wheel pockets WP (each) | 11 |
| Engine bay EB | 23 |
| Rear axle pocket RAP | 3 |

Figure 13B:
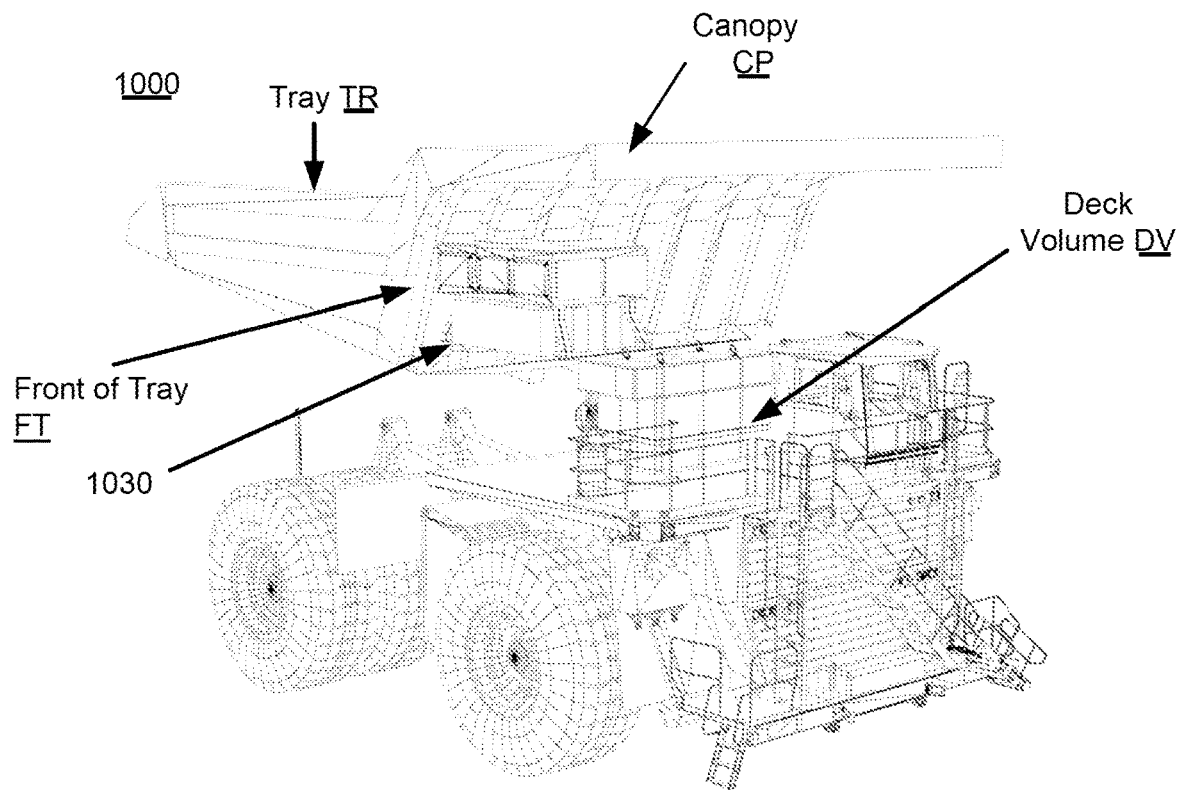
FIGS. 13B-13E are partially exploded views showing the placement of certain components of the hybrid haul truck shown in FIG. 13A.

FIG. 13B shows a battery system 1030 of the hybrid haul truck 1000 disposed in the deck volume DV (e.g., on the deck and near the front of tray FT). The battery system 1030 can be similar to and/or substantially the same as any of the battery systems described hereinabove. This positioning of battery system 1030 allows the mass of the battery system 1030 to be supported by the deck. Although not shown, in some embodiments, the deck can be reinforced and/or support structures can be added to support the additional weight on the deck as a result of the battery system 1030. In some embodiments, a retard grid or system (e.g., an electrical, mechanical, and/or hydraulic dynamic brake system) can be supported and/or raised allowing, for example, the battery system 1030 or at least a portion thereof to be positioned under the retard grid/system.

Figure 13C:
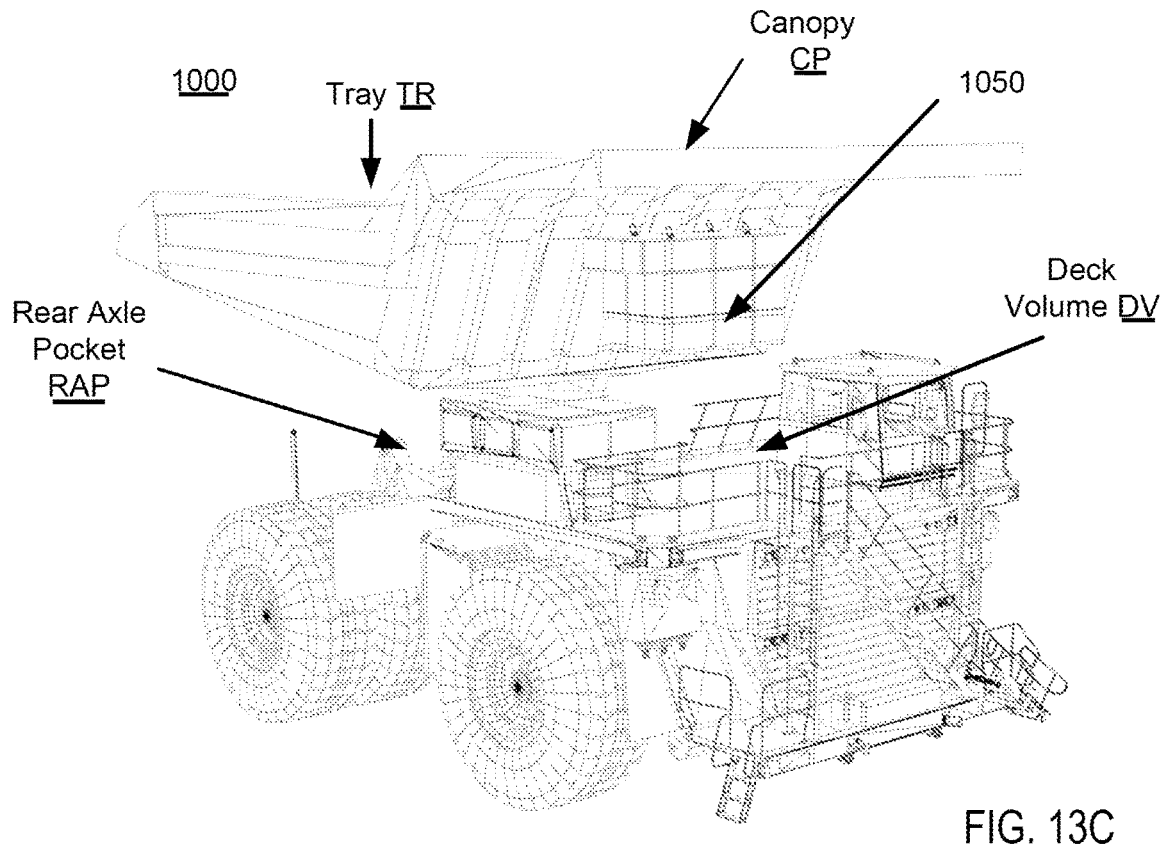

FIG. 13C shows electrical components, electrical systems, control systems, and/or other electrical and/or electronic components (referred to as "other components" or "other 1050") disposed in the deck volume DV next to the battery system 1030. For example, such other components 1050 can be disposed in an electrical and/or control cabinet. In some embodiments, placing the battery system 1030 and the control system (e.g., "other 1050") in the deck volume DV in relatively close proximity can simplify and/or optimize cable runs therebetween. In addition, the battery system 1030 and the control system (e.g., "other 1050") can be positioned on the deck in such a way that does not decrease or obstruct driver visibility, allowing the driver cab to remain in an unmodified or unchanged position within the deck volume DV.

Figure 13D:
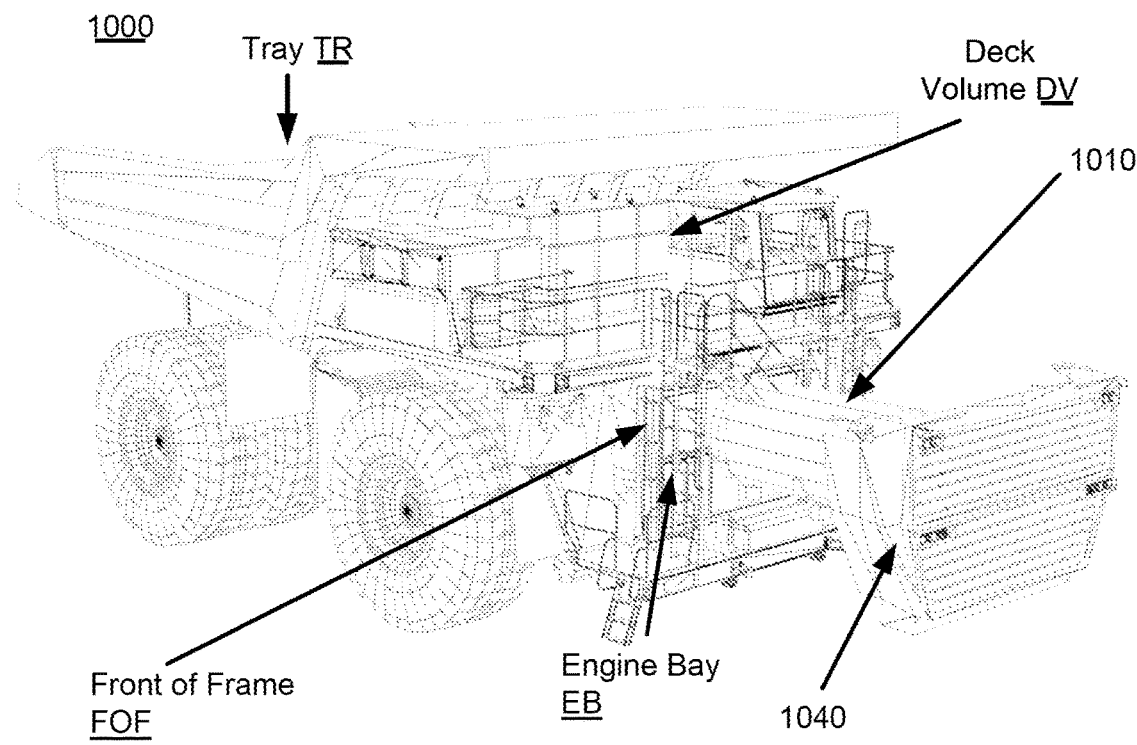

FIG. 13D shows a hydrogen storage system HSS 1010 of the hybrid haul truck 1000 disposed in the engine bay EB volume. In this embodiment, the HSS 1010 is configured to store liquid hydrogen (also referred to as LHSS 1010), and includes a single insulated hydrogen storage tank capable of holding a desired amount of liquid hydrogen (e.g., an amount that allows the hybrid haul truck 1000 to operate for at least 24 hrs before refueling). For example, the LHSS 1010 can be a single insulated tank with an exterior size and/or approximate volume that allows the LHSS 1010 to be disposed in the engine bay EB volume. Structural interfaces and/or support structures can be modified and/or added to support the weight and/or size of the LHSS 1010. Disposing the LHSS 1010 in the engine bay EB volume allows the LHSS 1010 to be bounded by the cooling system 1040 (or structures thereof) in the forward, the deck and/or tray in the rear and top, the chassis in the bottom, and the wheels on the sides. As such, the structures defining the engine bay EB volume or at least portions thereof can form a protected volume in which the LHSS 1010 is installed. FIG. 13D further shows a cooling system 1040 disposed in the front of frame FOF volume (e.g., mounted to a front portion of the frame in front of the LHSS 1010). Although not shown, the cooling system 1010 can include, for example, at least one main radiator to cool the fuel cell system 1020 and, optionally, one or more additional radiators to cool other components of the truck, such as the traction converter, power electronics, battery system 1020, and/or the like.

Figure 13E:
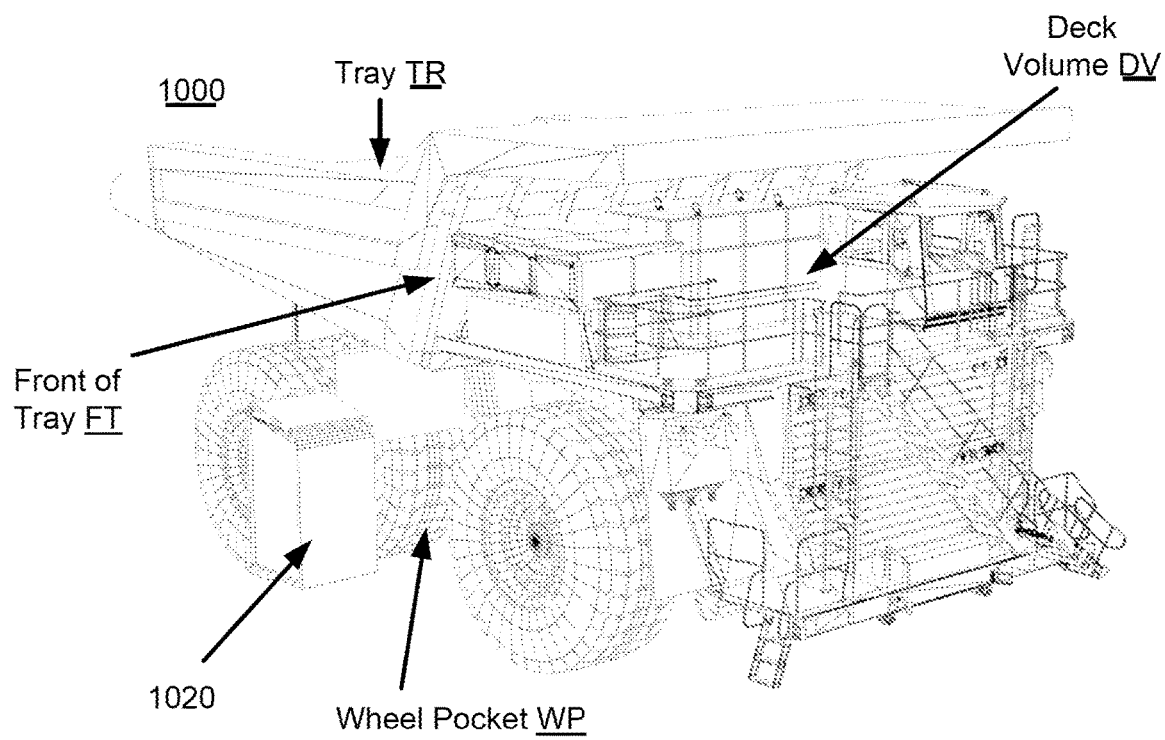

FIG. 13E shows a fuel cell system 1020 of the hybrid haul truck is disposed in the wheel pocket(s) WP. The fuel cell system 1020 can be similar to and/or substantially the same as any of the fuel cell systems described hereinabove. While FIG. 13E shows the fuel cell system 1020 disposed in the right wheel pocket WP, the fuel cell system 1020 can be disposed in the left wheel pocket WP or portions of the fuel cell system 1020 can be disposed in both the left and right wheel pockets WP. In some embodiments, support structure(s) and/or structural interface(s) can be modified and/or added to accommodate, secure, and/or protect the fuel cell system 1020 in the wheel pockets WP. The fuel cell system 1020 is protected in the wheel pockets WP while remaining accessible for maintenance, service, and/or replacement. This arrangement of the hybrid haul truck 1000 is also reflected in Table 16 below.

TABLE 16

| Volume/Component | HSS 1010 | Fuel cell system 1020 | Battery system 1030 | Cooling system 1040 | Other 1050 | HRSV (not shown) |
|---|---|---|---|---|---|---|
| Deck volume DV | | | Y | | Y | |
| Front of tray FT | | | Y | | Y | |
| Front of frame FOF | | | | Y | | |
| Left wheel pocket WP | | Y | | | | |
| Right wheel pocket WP | | Y | | | | |
| Engine bay EB | Y | | | | | |
| Rear axle pocket RAP | | | | | | Y |

FIG. 14 is a flowchart illustrating a method 10 of retrofitting a diesel-powered mining haul truck with a hybrid hydrogen fuel cell/battery-based powerplant, according to an embodiment. The mining haul truck can be similar to or substantially the same as any of the mining haul trucks described herein. Accordingly, the mining haul truck can be an ultra-class truck designed for use with a diesel powerplant and associated mechanical and/or electrical components. As described above with reference to specific embodiments, it may be desirable to retrofit the mining haul truck for use with a hybrid hydrogen fuel cell/battery-based powerplant and associated mechanical and/or electrical components.

Any suitable methods may be used to implement and/or perform one or more steps associated with retrofitting the mining haul truck. The method 10 shown in FIG. 14 is a non-limiting example of at least a part of the retrofit process. In this implementation, the method 10 includes removing, from a frame of the haul truck, (a) a diesel engine and an alternator from an engine bay, (b) a diesel tank from a first wheel pocket, and (c) a hydraulic fluid reservoir from a second wheel pocket to create at least a portion of a plurality of available volumes, at 11. As described above, the diesel engine, alternator, and/or any other associated components can be removed from the haul truck and replaced with suitable components of the hybrid hydrogen fuel cell/battery-based powerplant.

The hydraulic fluid reservoir, on the other hand, is a component associated with the operation of the tray (dumping) and/or other components unrelated to the diesel-based powerplant. Thus, in some implementations, it is desirable to use the hydraulic fluid reservoir as a component of the retrofit haul truck. In this implementation, it may be desirable to position one or more components of the hybrid hydrogen fuel cell/battery-based powerplant in the second wheel pocket where the hydraulic fluid reservoir was originally installed. Accordingly, after removing the hydraulic fluid reservoir from the second wheel pocket, the method 10 includes installing the hydraulic fluid reservoir in a rear axle pocket of the haul truck, at 12.

While the method 10 is described as relocating the hydraulic fluid reservoir (e.g., removing at step 11 and installing at step 12), in other implementations, it may be desirable to remove the pre-existing hydraulic fluid reservoir and installing a separate, new, and/or different hydraulic fluid reservoir or equivalent component in the rear axle pocket of the haul truck. For example, it may be desirable to replace the pre-existing hydraulic fluid reservoir with a hydraulic fluid reservoir that has been shaped, designed, and/or otherwise configured for installation in the rear axle pocket, thereby ensuring the installation of the hydraulic fluid reservoir does not interfere with the normal operation of (1) the hydraulic system and/or (2) any other components of the haul truck.

The method 10 further includes installing at least a portion of a fuel cell system, a battery system, or a liquid hydrogen storage system (LHSS) in at least one of the available volumes created by removing the components of the diesel-based powerplant, at 13. For example, the fuel cell system, the battery, and the LHSS can be installed in any of the available volumes according to any of the embodiments described in detail above with reference Tables 4, 5, 7, 8, 10, 12, 14, and 15.

Figure 15:
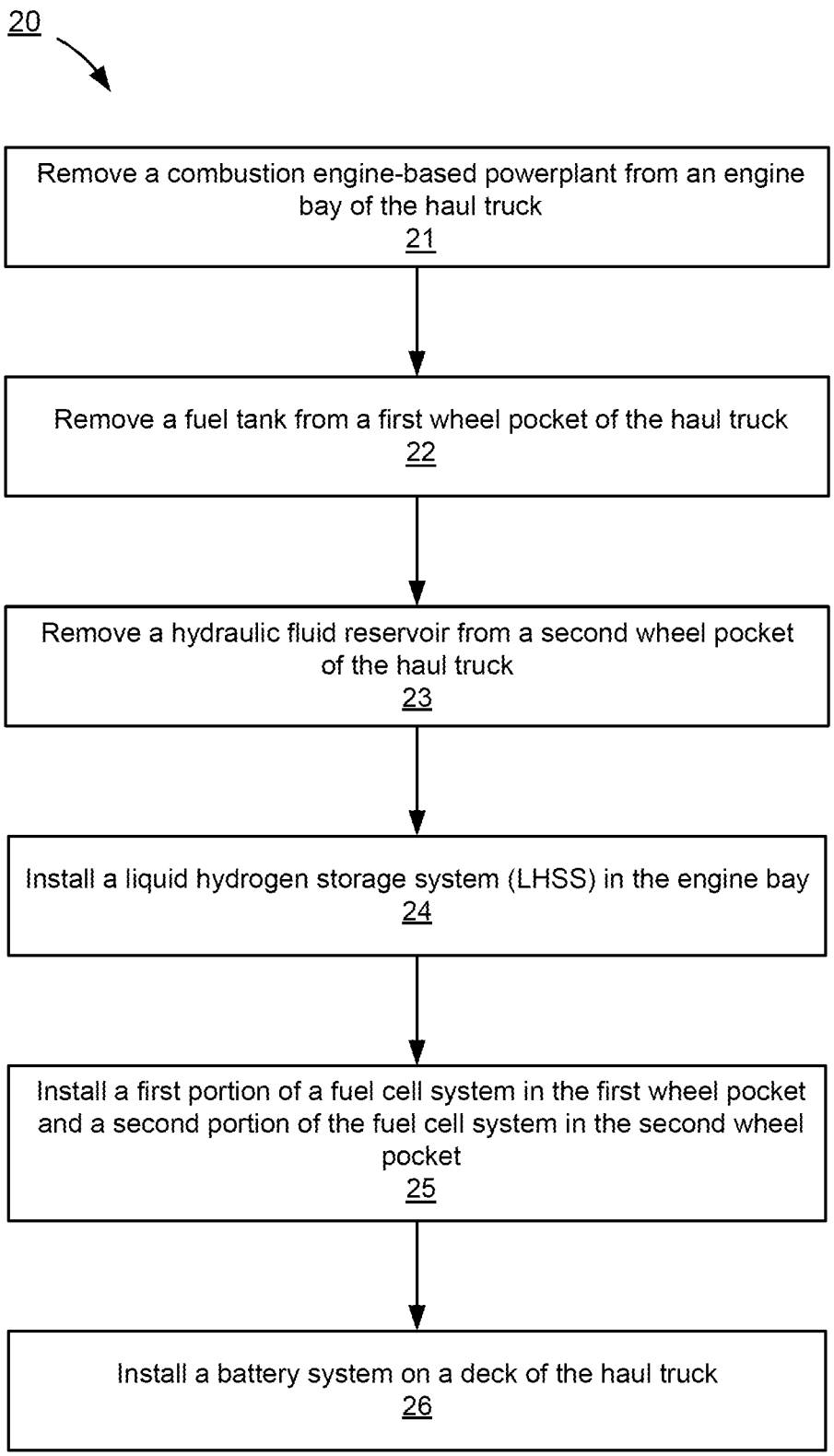
FIG. 15 is a flowchart illustrating a method of retrofitting a combustion engine powered mining haul truck with a hybrid hydrogen fuel cell/battery-based powerplant, according to an embodiment.

FIG. 15 is another non-limiting example of a method 20 for retrofitting a diesel-powered mining haul truck for use with a hybrid hydrogen fuel cell/battery-based powerplant. In this implementation, the method 20 includes removing a diesel powerplant from an engine bay of the haul truck, at 21; removing a diesel tank from a first wheel pocket, at 22; and removing a hydraulic fluid reservoir from a second wheel pocket, at 23. As described above with reference to the method 10, components of and/or associated with the diesel power plant are removed from the haul truck and replaced with components of the hybrid hydrogen fuel cell/battery-based powerplant. On the other hand, the method 20 may optionally include relocating and/or installing the hydraulic fluid reservoir in a rear axle pocket of the haul truck.

The hybrid hydrogen fuel cell/battery-based powerplant can include any suitable components. For example, the hybrid hydrogen fuel cell/battery-based powerplant can include at least a hydrogen storage system, a fuel cell system, and a battery system. In the implementation shown in FIG. 15, the hydrogen storage system can be configured to store liquid hydrogen (e.g., a liquid hydrogen storage system (LHSS)). In some implementations, the fuel cell system can be configured to use the liquid hydrogen as fuel, or the liquid hydrogen can be evaporated and/or vaporized into a gaseous state for use by the fuel cell system.

The method 20 includes installing the LHSS in the engine bay of the haul truck, at 24. The LHSS can be similar to and/or substantially the same as any of the LHSS described herein. Installing the LHSS in the engine bay can allow, for example, the LHSS to be bounded by the deck and/or tray at or along the rear and top of the engine bay, the chassis at or along the bottom of the engine bay, and the wheels at or along the sides of the engine bay. As such, the structures defining the engine bay or at least portions thereof can form a protected volume in which the LHSS.

At 25, a first portion of the fuel cell system is installed in the first wheel pocket and a second portion of the fuel cell system is installed in the second wheel pocket. The fuel cell system can be similar to and/or substantially the same as any of the fuel cell systems described herein. In some implementations, support structure(s) and/or structural interface(s) can be modified and/or added to accommodate, secure, and/or protect the fuel cell system 1020 in the wheel pockets WP. In some implementations, installing the fuel cell system in the wheel pockets allows the fuel cell system to be protected in and/or by the structures/wheels surrounding the wheel pockets WP, while remaining accessible for maintenance, service, and/or replacement.

The method 20 further includes installing a battery system on a deck of the haul truck, at 26. The battery system can be similar to and/or substantially the same as any of the battery systems described hereinabove. In some implementations, installing the battery system on the deck allows the mass of the battery system to be supported. In some implementations, installing the battery system can optionally include installing support and/or reinforcing support structures of the deck to support the additional weight associated with the battery system. In some embodiments, the method 20 may optionally include installing a support structure on the deck configured to support a dynamic braking system (a retard grid or system, and/or the like) that raises at least a portion of the dynamic braking system to define a space below the dynamic braking system. Accordingly, in some implementations, installing the battery system can include installing the battery system in the space below the raised dynamic braking system.

Although not shown in FIG. 15, the method 20 may further include electrically and/or fluidically connecting the components of the hybrid hydrogen fuel cell/battery-based system. Accordingly, the mining haul truck can be retrofit to replace the pre-existing diesel-based powerplant with the hybrid hydrogen fuel cell/battery-based system.

While various embodiments have been particularly shown and described, it should be understood that they have been presented by way of example only, and not limitation. Various changes in form and/or detail may be made without departing from the spirit of the disclosure and/or without altering the function and/or advantages thereof unless expressly stated otherwise. Where schematics and/or embodiments described above indicate certain components arranged in certain orientations or positions, the arrangement of components may be modified.

Although various embodiments have been described as having particular features and/or combinations of components, other embodiments are possible having a combination of any features and/or components from any of embodiments described herein, except mutually exclusive combinations. The embodiments described herein can include various combinations and/or sub-combinations of the functions, components, and/or features of the different embodiments described.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed:

1. A retrofit mining haul truck including a hybrid hydrogen fuel cell/battery-based powerplant in place of a carbon fuel-based powerplant, the retrofit mining haul truck comprising:
   a frame;
   a tray coupled to the frame;
   a deck coupled to the frame forward of at least a portion of the tray;
   a battery system mounted to the deck of the retrofit mining haul truck;
   a hydrogen storage system (HSS) installed in an engine bay volume of the retrofit mining haul truck, the engine bay configured to contain a combustion engine prior to retrofitting the retrofit mining haul truck; and
   a fuel cell system, a first portion of the fuel cell system installed in a first wheel pocket of the retrofit mining haul truck and a second portion of the fuel cell system installed in a second wheel pocket of the retrofit mining haul truck, the first wheel pocket configured to contain a fuel tank and the second wheel pocket configured to contain a hydraulic fluid reservoir prior to retrofitting the retrofit mining haul truck.

2. The retrofit mining haul truck of claim 1, wherein the combustion engine is a diesel engine.

3. The retrofit mining haul truck of claim 1, wherein the hydraulic fluid reservoir is relocated from the second wheel pocket to a rear axle pocket of the frame as a result of the retrofit.

4. The retrofit mining haul truck of claim 1, further comprising:
   a cooling system mounted to a front portion of the frame forward of the HSS, the cooling system configured to cool at least the fuel cell system, the front of the frame configured to couple to a cooling system of the carbon fuel-based powerplant prior to retrofitting the retrofit mining haul truck.

5. The retrofit mining haul truck of claim 1, further comprising:
   a control system mounted to the deck and electrically connected to each of the fuel cell system, the battery system, and the HSS.

6. The retrofit mining haul truck of claim 1, wherein the HSS is configured to store hydrogen in a liquid state.

7. A method of retrofitting a combustion engine powered mining haul truck with a hybrid hydrogen fuel cell/battery-based powerplant, the method comprising:
   removing, from a frame of the haul truck, (a) a combustion engine and an alternator from an engine bay, (b) a fuel tank from a first wheel pocket, and (c) a hydraulic fluid reservoir from a second wheel pocket to create at least a portion of a plurality of available volumes;
   installing the hydraulic fluid reservoir in a rear axle pocket of the haul truck; and
   installing at least a portion of a fuel cell system, a battery system, or a liquid hydrogen storage system (LHSS) in at least one of the available volumes.

8. The method of claim 7, wherein the combustion engine is a diesel engine and the fuel tank is a diesel fuel tank.

9. The method of claim 7, wherein the combustion engine is configured to generate power by combusting a carbon-based fuel and the fuel tank is configured to contain the carbon-based fuel.

10. The method of claim 7, further comprising:
    modifying a deck of the haul truck to create a deck volume, the deck volume being an available volume from the plurality of available volumes; and
    installing at least a portion of the battery system in the deck volume.

11. The method of claim 10, further comprising:
    reinforcing at least a portion of the deck in response to a weight of at least the portion of the battery system installed on the deck.

12. The method of claim 10, wherein the installing at least the portion of the battery system on the deck of the haul truck includes installing at least the portion of the battery system in a space below a dynamic braking system of the haul truck.

13. The method of claim 12, further comprising:
    installing a support structure on the deck configured to support the dynamic braking system, the support structure raising at least a portion of the dynamic braking system to define the space below the dynamic braking system.

14. The method of claim 7, wherein the installing at least a portion of the fuel cell system, the battery system, or the LHSS in at least one of the available volumes includes installing a first portion of the fuel cell system in the first wheel pocket and a second portion of the fuel cell system in the second wheel pocket.

15. The method of claim 14, further comprising:
    electrically connecting each of the first portion of the fuel cell system, the second portion of the fuel cell system, and the battery system to a control system installed on a deck of the haul truck.

16. The method of claim 7, wherein the installing at least a portion of the fuel cell system, the battery system, or the LHSS in at least one of the available volumes includes installing the LHSS in an available volume associated with the engine bay.

17. The method of claim 7, further comprising:
    removing a radiator from the frame of the haul truck to create a front of frame volume, the front of frame volume being an available volume from the plurality of available volumes; and
    installing a cooling system in the front of frame volume, the cooling system configured to cool at least the fuel cell system.

18. The method of claim 17, further comprising:
    fluidically connecting the LHSS to the fuel cell system; and
    fluidically connecting the cooling system to the fuel cell system.

19. A method of retrofitting a combustion engine powered mining haul truck with a hybrid hydrogen fuel cell/battery-based powerplant, the method comprising:
    removing a combustion engine-based powerplant from an engine bay of the haul truck;
    removing a fuel tank from a first wheel pocket and a hydraulic fluid reservoir from a second wheel pocket;
    installing a liquid hydrogen storage system (LHSS) in the engine bay;
    installing a first portion of a fuel cell system in the first wheel pocket and a second portion of the fuel cell system in the second wheel pocket; and
    installing a battery system on a deck of the haul truck.

20. The method of claim 19, further comprising:
    installing hydraulic fluid reservoir in a rear axle pocket of the haul truck.

21. The method of claim 19, wherein the combustion engine is a diesel engine and the fuel tank is a diesel fuel tank.

22. The method of claim 19, wherein the combustion engine is configured to generate power by combusting a carbon-based fuel and the fuel tank is configured to contain the carbon-based fuel.

23. The method of claim 19, further comprising:
electrically connecting each of the first portion of the fuel cell system, the second fuel cell system, and the battery system to a control system installed on a deck of the haul truck.

24. The method of claim 19, further comprising:
removing a cooling system configured to cool the combustion engine-based powerplant from a front portion of a frame of the haul truck; and
installing, to the front portion of the frame of the haul truck and after installing the LHSS in the engine bay, a cooling system configured to cool at least the fuel cell system.

25. The method of claim 24, further comprising:
fluidically connecting the LHSS to each of the first portion of the fuel cell system and the second portion of the fuel cell system; and
fluidically connecting the cooling system to each of the first portion of the fuel cell system and the second portion of the fuel cell system.

26. The method of claim 19, wherein the installing the battery system on the deck of the haul truck includes installing the battery system in a space below a dynamic braking system of the haul truck.

27. The method of claim 26, further comprising:
installing a support structure on the deck configured to support the dynamic braking system, the support structure raising at least a portion of the dynamic braking system to define the space below the dynamic braking system.

28. The method of claim 19, further comprising:
reinforcing at least a portion of the deck in response to a weight of at least the portion of the battery system installed on the deck.

* * * * *